(12) United States Patent
Romatier et al.

(10) Patent No.: US 10,222,787 B2
(45) Date of Patent: Mar. 5, 2019

(54) INTERACTIVE PETROCHEMICAL PLANT DIAGNOSTIC SYSTEM AND METHOD FOR CHEMICAL PROCESS MODEL ANALYSIS

(71) Applicant: UOP LLC, Des Plaines, IL (US)

(72) Inventors: Christophe Romatier, Wilmette, IL (US); Ian G. Horn, Streamwood, IL (US); Paul Kowalczyk, Hoffman Estates, IL (US); Zak Alzein, Burr Ridge, IL (US); David Rondeau, Stoneham, MA (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/705,628

(22) Filed: Sep. 15, 2017

(65) Prior Publication Data

US 2018/0081344 A1 Mar. 22, 2018

Related U.S. Application Data

(60) Provisional application No. 62/395,912, filed on Sep. 16, 2016.

(51) Int. Cl.
| | | |
|---|---|---|
| G06F 19/00 | (2018.01) | |
| G05B 19/418 | (2006.01) | |
| G06F 3/0481 | (2013.01) | |
| G08B 21/18 | (2006.01) | |

(Continued)

(52) U.S. Cl.
CPC ......... *G05B 19/4184* (2013.01); *G05B 23/02* (2013.01); *G06F 3/0481* (2013.01); *G08B 21/187* (2013.01); *G05B 2219/31124* (2013.01); *G05B 2219/31439* (2013.01);

(Continued)

(58) Field of Classification Search
CPC ...... G05B 19/4184; G05B 2219/31439; G05B 2219/31124; G05B 2219/32128; G08B 21/187; G06F 3/0481; G06F 3/147
See application file for complete search history.

(56) References Cited

U.S. PATENT DOCUMENTS

| | | |
|---|---|---|
| 6,795,798 B2 | 9/2004 | Eryurek et al. |
| 7,067,333 B1 | 6/2006 | Pasadyn et al. |
| 7,133,807 B2 | 11/2006 | Karasawa |

(Continued)

FOREIGN PATENT DOCUMENTS

WO 2009046095 A1 4/2009

OTHER PUBLICATIONS

Feb. 28, 2018—U.S. Non-Final Office Action—U.S. Appl. No. 15/665,042.

(Continued)

*Primary Examiner* — Michael D Masinick
(74) *Attorney, Agent, or Firm* — Banner & Witcoff, Ltd.

(57) ABSTRACT

A petrochemical plant or refinery may include equipment such as pumps, compressors, valves, exchangers, columns, adsorbers, or the like. Some petrochemical plants or refineries may include one or more sensors configured to collect operation information of the equipment in the plant or refinery. A faulty condition of a process of the petrochemical plant may be diagnosed based on the operation of the plant equipment. A diagnostic system, which may receive operation information from the one or more sensors, may include a detection platform, an analysis platform, a visualization platform, and/or an alert platform.

22 Claims, 21 Drawing Sheets

(51) Int. Cl.
   *G05B 23/02* (2006.01)
   *G06F 3/147* (2006.01)
(52) U.S. Cl.
   CPC .... *G05B 2219/32128* (2013.01); *G06F 3/147* (2013.01); *G06F 2203/04803* (2013.01)

(56) References Cited

U.S. PATENT DOCUMENTS

| | | |
|---|---|---|
| 7,151,966 B1 | 12/2006 | Baier et al. |
| 8,204,717 B2 | 6/2012 | McLaughlin et al. |
| 2002/0123864 A1 | 9/2002 | Eryurek et al. |
| 2002/0179495 A1 | 12/2002 | Heyse et al. |
| 2003/0147351 A1 | 8/2003 | Greenlee |
| 2004/0220778 A1 | 11/2004 | Imai et al. |
| 2006/0133412 A1 | 6/2006 | Callaghan |
| 2007/0059838 A1 | 3/2007 | Morrison et al. |
| 2007/0250292 A1 | 10/2007 | Alagappan et al. |
| 2008/0086322 A1 | 4/2008 | Wallace |
| 2009/0312851 A1* | 12/2009 | Mishra ............... G05B 17/02 700/30 |
| 2011/0311014 A1 | 12/2011 | Hottovy et al. |
| 2012/0083933 A1 | 4/2012 | Subbu et al. |
| 2012/0095808 A1 | 4/2012 | Kattapuram et al. |
| 2013/0270157 A1 | 10/2013 | Ferrara |
| 2013/0311437 A1 | 11/2013 | Stluka et al. |
| 2014/0032169 A1* | 1/2014 | McCarthy .......... G05B 19/4184 702/182 |
| 2014/0250153 A1* | 9/2014 | Nixon ............... G06F 17/30312 707/812 |
| 2015/0077263 A1 | 3/2015 | Ali et al. |
| 2015/0185716 A1 | 7/2015 | Wichmann et al. |
| 2015/0276208 A1 | 10/2015 | Maturana et al. |
| 2015/0362408 A1* | 12/2015 | Rosendo ............ G05B 23/0221 702/104 |
| 2016/0033941 A1 | 2/2016 | T et al. |
| 2016/0098037 A1 | 4/2016 | Zornio et al. |
| 2016/0147204 A1 | 5/2016 | Wichmann et al. |

OTHER PUBLICATIONS

Dec. 14, 2017—(WO) International Search Report—App PCT/US2017/051954.
Sep. 22, 2017—U.S. Non-Final Office Action—U.S. Appl. No. 15/658,174.
Jan. 26, 2018—U.S. Non-Final Office Action—U.S. Appl. No. 15/640,120.
Jun. 6, 2018—U.S. Final Office Action—U.S. Appl. No. 15/640,120.

* cited by examiner

INTERACTIVE PETROCHEMICAL PLANT DIAGNOSTIC SYSTEM AND METHOD FOR CHEMICAL PROCESS MODEL ANALYSIS

CROSS-REFERENCE TO RELATED APPLICATIONS

This application claims, under 35 U.S.C. § 119(e), the benefit of U.S. Application No. 62/395,912, filed Sep. 16, 2016, which is incorporated by reference in its entirety.

FIELD

This disclosure is related to a method and system for controlling the operation of a plant, such as a petrochemical plant or a refinery, and more particularly to interactive diagnostic systems for managing process model analysis.

BACKGROUND

A diagnostic system for monitoring a refinery unit is a feature of controlling the operation of the plant for early detection of a faulty condition based on a change in a process model. Companies operating refineries and petrochemical complexes typically face tough challenges in today's environment. These challenges may include a slow detection of and response to the faulty condition, increasingly complex technologies, a reduction in workforce experience levels and changing environmental regulations.

Facilitating a troubleshooting or corrective action for correcting the faulty condition is a difficult task for a plant operator. A timely and prompt corrective action is needed to save operational expenses and time for an enhanced outcome of the plant. In certain cases, reviewing data related to the faulty condition on a periodic basis is a time-consuming, complicated, and difficult process for the plant operator.

But conventional diagnostic systems lack effective alert mechanisms that provide accurate notifications for the plant operator. Further, when the plant operator is in need of additional assistance from a process specialist, the conventional diagnostic systems are unable to provide adequate alerts to the process specialist.

Developing an intuitive interface is a task for the plant operator because a proper diagnostic analysis of a chemical process may promptly identify a root cause of the faulty condition. Promptly identifying the root cause of the faulty conditions or operational gaps may significantly reduce the operational expenses and time.

Therefore, there is a need for an improved diagnostic system for managing the process model analysis.

SUMMARY

A general object of the disclosure is to improve diagnostic operation efficiency of petrochemical plants and refineries. A more specific object of this disclosure is to overcome one or more of the problems described above. A general object of this disclosure may be attained, at least in part, through a method for improving operation of a plant. The method may include obtaining plant operation information from the plant.

A method for improving operation of a plant may include obtaining plant operation information from the plant and generating a plant process model using the plant operation information. The method may include receiving plant operation information over the internet and automatically generating a plant process model using the plant operation information.

The present disclosure may use configured process models to monitor, predict, and/or optimize performance of individual process units, operating blocks and/or complete processing systems. Routine and frequent analysis of predicted versus actual performance allows early identification of operational discrepancies which may be acted upon to optimize impact.

This method may be implemented using a web-based computer system. The benefits of executing work processes within this platform include improved plant performance due to an increased ability by operations to identify and capture opportunities, a sustained ability to bridge performance gaps, an increased ability to leverage personnel expertise, and improved enterprise management.

A data collection system at a plant may capture data that may be automatically sent to a remote location, where it may be processed to, for example, eliminate errors and biases, and may be used to calculate and report performance results. The performance of the plant and/or individual process units of the plant may be compared to the performance predicted by one or more process models to identify any operating differences or gaps.

A diagnostic report, such as a daily report, showing actual performance compared to predicted performance may be generated and delivered to one or more devices, via, for example, the internet or other wireless communication means. The identified performance gaps or differences may be associated with the cause of the gaps. The identified performance gaps may be used to resolve the performance gaps. The method of this disclosure may use the process models and plant operation information to run optimization routines that converge on an optimal plant operation for the given values of, for example, feed, products and prices.

The method of this disclosure may include recommendations to adjust process conditions allowing the plant to run continuously at or closer to optimal conditions. The method may provide one or more alternatives for improving or modifying the operations of the plant. The method may regularly maintain and/or tune the process models to correctly represent the true potential performance of the plant based on one or more signals and parameters related to the operations of the plant. In one or more embodiments, the method may include optimization routines configured according to specific criteria, which may be used to identify optimum operating points, evaluate alternative operations, and/or perform feed evaluations.

The present disclosure provides a repeatable method that will help refiners bridge the gap between actual and achievable performance. The method may use process development history, modeling and stream characterization, and plant automation experience to protect data security, and efficiently aggregate, manage, and move large amounts of data. Web-based optimization may be an enabler to achieving and sustaining maximum process performance by connecting, on a virtual basis, technical expertise and the plant process operations staff.

The enhanced workflow may use configured process models to monitor, diagnose, predict, and/or optimize performance of individual process units, operating blocks, or complete processing systems. Routine and frequent analysis of predicted versus actual performance may allow early identification of operational discrepancies, which may be acted upon to optimize impact.

As used herein, references to a "routine" are to be understood to refer to a computer program or sequence of computer programs or instructions for performing a particular task. References herein to a "plant" are to be understood to refer to any of various types of chemical and petrochemical manufacturing or refining facilities. References herein to a plant "operators" are to be understood to refer to and/or include, without limitation, plant planners, managers, engineers, technicians, and others interested in, overseeing, and/or running the daily operations at a plant.

The foregoing and other aspects and features of the present disclosure will become apparent to those of reasonable skill in the art from the following detailed description, as considered in conjunction with the accompanying drawings.

DETAILED DESCRIPTION

Figure 1:
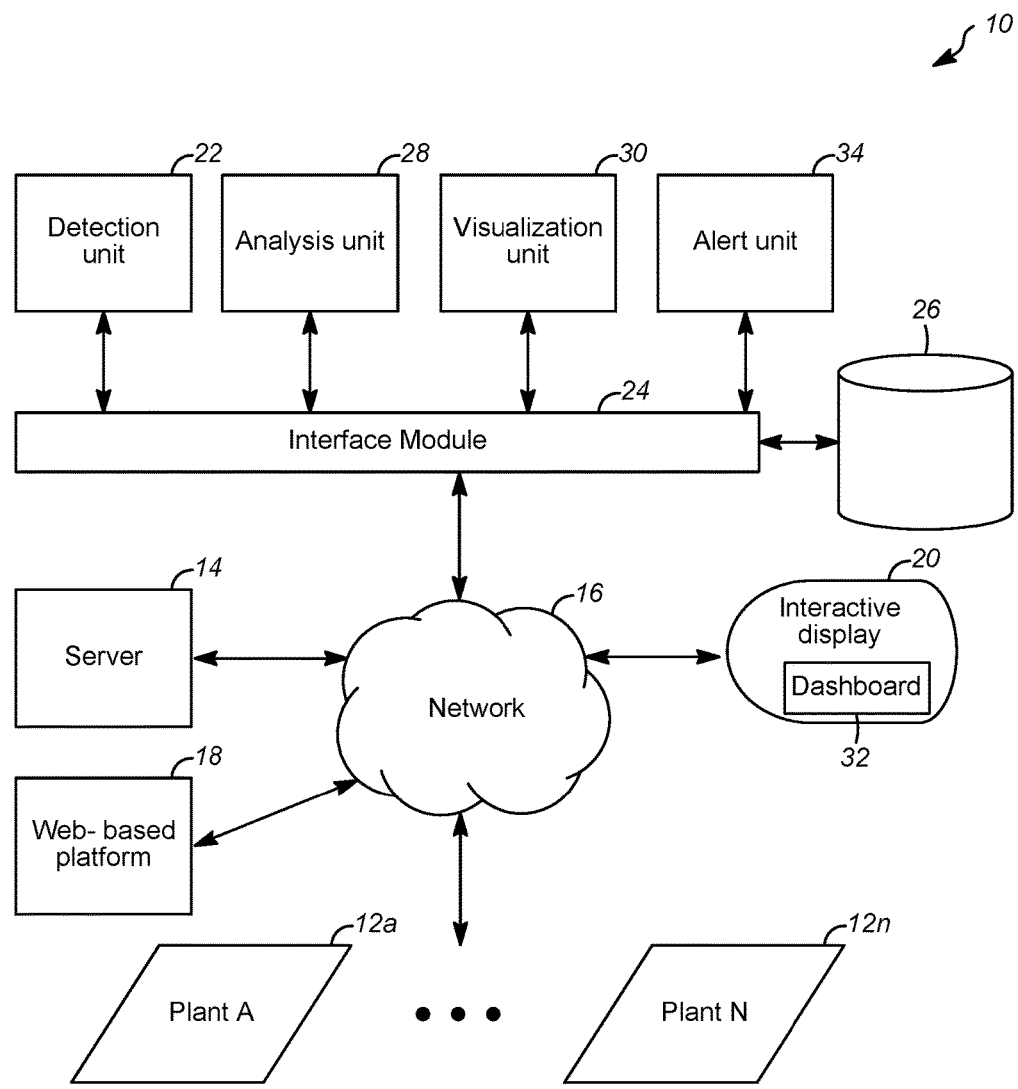
FIG. 1 depicts an illustrative functional block diagram of a diagnostic system in accordance with one or more embodiments of the present disclosure.

Referring now to FIG. 1, an illustrative diagnostic system, generally designated 10, using one or more embodiments of the present disclosure is provided for improving operation of one or more plants (e.g., Plant A . . . Plant N) 12a-12n, such as a chemical plant or refinery, or a portion thereof. The diagnostic system 10 may use plant operation information obtained from at least one plant of the one or more plants 12a-12n, which may be the current plant (e.g., Plant A) 12a, other third party or customer plants (e.g., Plant N) 12n, and/or proprietary services, subsidiaries, and the like. An illustrative plant management system is disclosed in U.S. Provisional Patent Application No. 62/127,642, filed Mar. 3, 2015, which is incorporated by reference in its entirety.

As used herein, the terms "system," "unit," or "module" may refer to, be part of, or include an Application Specific Integrated Circuit (ASIC), an electronic circuit, a memory (shared, dedicated, or group) and/or computer processor (shared, dedicated, or group) that executes one or more software or firmware programs, a combinational logic circuit, and/or other suitable components that provide the described functionality.

Thus, while this disclosure includes particular examples and arrangements of the units, the scope of the present system is not so limited, since other modifications will become apparent to the skilled practitioner. The software programs may be written in HTML5, CSS3, Java, Javascript, PHP, HTML, C, C++, C#, AJAX, Python, Ruby, Perl, Objective-C, .NET, SQL, Ruby on Rails, Swift, Rust, Elixir, Go, TypeScript, or one or more other suitable computer programming language.

The diagnostic system 10 may reside in or be coupled to a server or computing device 14 (including, e.g., database servers, video servers), and may be programmed to perform tasks and/or cause display of relevant data for one or more different functional units. Some or all relevant information may be stored in one or more databases for retrieval by the diagnostic system 10 or the computing device 14 (e.g., a data storage device and/or a machine-readable data-storage medium carrying computer programs).

The numerous elements of the diagnostic system 10 may be communicatively coupled through one or more networks (e.g., network 16). For example, the numerous platforms, devices, sensors, and/or components of the computing system environment illustrated in FIG. 1 may be communicatively coupled through a private network. The sensors may be positioned on various components in the plant and may communicate wirelessly or wired with one or more platforms. The private network may comprise, in some examples, a network firewall device to prevent unauthorized access to the data and devices on the private network. Alternatively, the private network may be isolated from external access through physical means, such as a hard-wired network with no external, direct-access point. The data communicated on the private network may be optionally encrypted for further security. Depending on the frequency of collection and transmission of sensor measurements and other data, the private network may experience large bandwidth usage and be technologically designed and arranged to accommodate for such technological issues. Moreover, the computing system environment may also include a public network that may be accessible to remote devices. In some examples, a remote device (e.g., a remote device associated with a plant operator) may be located not in the proximity (e.g., more than one mile away) of the various sensor, measurement, and data capture systems (e.g., which may be located at or near the one or more plants 12a-12n). In other examples, the remote device may be physically located inside a plant (e.g., a plant of the one or more plants 12a-12n), but restricted from access to the private network; in other words, the adjective "remote," need not necessarily require the device to be located at a great distance from the sensor systems and other components. One or more other suitable networks may be used, such as the internet, a wireless network (e.g., Wi-Fi), a corporate Intranet, a local area network (LAN), a wide area network (WAN), and/or the like.

The diagnostic system 10 may be partially or fully automated. In one or more embodiments, the diagnostic system 10 may be performed by a computer system, such as a third-party computer system, remote from a plant of the one or more plants 12a-12n and/or the plant planning center. The diagnostic system 10 may include a web-based platform 18 that may send and/or receive information over a communication network (e.g., the internet). Specifically, the diagnostic system 10 may receive signals and/or parameters via the network 16, and may cause display (e.g., in real time, in substantially real time, after a slight delay, after a long delay) of related performance information on an interactive display device (e.g., interactive display device 20).

Using a web-based system may provide one or more benefits, such as improved plant performance due to an increased ability to identify and capture opportunities, a sustained ability to bridge plant performance gaps, and/or an increased ability to leverage personnel expertise and improve training and development. The method may allow for automated daily evaluation of process performance, thereby increasing the frequency of plant performance review with less time and effort from plant operations staff.

The web-based platform 18 may allow one or more users to work with the standardized information, thereby creating a collaborative environment (e.g., for sharing best practices or for troubleshooting). The method may provide more accurate prediction and optimization results due to fully configured models, which may include, for example, catalytic yield representations, constraints, degrees of freedom, and/or the like. Routine automated evaluation of plant planning and operation models may allow timely plant model tuning to reduce or eliminate gaps between plant models and actual plant performance. Implementing the method using the web-based platform 18 may allow for monitoring and/or updating multiple sites, thereby better enabling facility planners to propose realistic optimal targets.

The diagnostic system 10 may include one or more computing platforms, which may include one or more communication interfaces configured to interface with one or more other computing platforms (e.g., via an interface module, a network); one or more databases; one or more processors; and/or memory storing computer-readable instructions that, when executed by the one or more processors, cause the one or more computing platforms to perform one or more actions or steps. In one or more embodiments, the diagnostic system may be implemented as a computer program or suite of computer programs including instructions arranged such that when executed by one or more computers, the instructions cause the one or more computers to perform one or more functions described herein. One or more embodiments may include at least one computer-readable medium storing a computer program or at least one of the suite of computer programs. One or more embodiments may include an apparatus including at least one processor and memory storing instructions that, when executed by the at least one processor, cause the apparatus to perform one or more functions described herein. In one or more embodiments, the diagnostic system may include a detection unit 22, an analysis unit 28, a visualization unit 30, an alert unit 34, an interface module 24, a server 14, a web-based platform 18, and/or one or more additional devices, platforms, or systems.

The diagnostic system 10 may include a detection unit 22 configured to detect a faulty condition of the refining or petrochemical process of at least one plant of the one or more plants 12a-12n. In some refineries or petrochemical plants, various parameters or measurements might differ between different levels, pieces of equipment, processes, or other aspects of a plant (e.g., a plant of the one or more plants 12a-12n). Consequently, diagnosing different process models being executed may depend on different parameters or measurements. In some embodiments, the detection unit 22 may automatically detect one or more faulty conditions based on readings of the parameters or measurements. The detection unit 22 may generate one or more alerts associated with the detected one or more faulty conditions.

The diagnostic system 10 may use process measurements to monitor the performance of any of the following process equipment: pumps, compressors, heat exchangers, fired heaters, control valves, fractionation columns, reactors, and/or other process equipment commonly found in the refining and petrochemical industry.

The diagnostic system 10 may use process measurements from various sensor and monitoring devices to monitor conditions in, around, and on process equipment. Such sensors may include, but are not limited to, pressure sensors, differential pressure sensors, various flow sensors (including but not limited to orifice plate type, disc sensors, venturi), temperature sensors including thermal cameras and skin thermocouples, capacitance sensors, weight sensors, gas chromatographs, moisture sensors, ultrasonic sensors, position sensors, timing sensors, vibration sensors, level sensors, liquid level (hydraulic fluid) sensors, and other sensors commonly found in the refining and petrochemical industry. Further, process laboratory measurements may be taken using gas chromatographs, liquid chromatographs, distillation measurements, octane measurements, and other laboratory measurements. System operational measurements also can be taken to correlate the system operation to the rotating equipment measurements.

In addition, sensors may include transmitters and deviation alarms. These sensors may be programmed to set off an alarm, which may be audible and/or visual.

Other sensors may transmit signals to a processor or a hub that collects the data and sends to a processor. For example, temperature and pressure measurements may be sent to diagnostic system 10. In one example, temperature sensors may include thermocouples, fiber optic temperature measurement, thermal cameras, and/or infrared cameras. Skin thermocouples may be applied to equipment casing, or alternatively, to tubes, plates, or placed directly on a wall of a component of a piece of equipment. Alternatively, thermal (infrared) cameras may be used to detect temperature (e.g., hot spots) in one or more aspects of the equipment. A shielded (insulated) tube skin thermocouple assembly may be used to obtain accurate measurements. One example of a thermocouple may be a removable Xtracto™ Pad. A thermocouple may be replaced without any additional welding. Clips and/or pads may be utilized for ease of replacement. Fiber Optic cable may be attached to the pipe, line, and/or vessel to provide a complete profile of temperatures.

Sensors may be also used throughout a plant or equipment to detect and monitor various issues such as PV detection, surge detection, fouling, gas quality, dew point characteristics, and/or production levels. Sensors might be able to detect whether feed composition, such as pH, are outside of acceptable ranges leading to a corrosive environment or whether consumption of sacrificial anodes (in water services) is nearing completion and resulting in a corrosive environment. Sensors detecting outlet temperatures and pressure drops may be used to determine/predict flow and production rate changes.

Furthermore, flow sensors may be used in flow paths such as the inlet to the path, outlet from the path, or within the path. If multiple tubes are utilized, the flow sensors may be placed in corresponding positions in each of multiple machines. In this manner, diagnostic system 10 may determine if one of the machines is behaving abnormally compared to one or more of the others. Flow may be determined by pressure-drop across a known resistance, such as by using pressure taps. In other examples, flow may be inferred using fluid density in addition to suction and discharge pressures. Other types of flow sensors include, but are not limited to, ultrasonic, turbine meter, hot wire anemometer, vane meter, Kármán™, vortex sensor, membrane sensor (membrane has a thin film temperature sensor printed on the upstream side, and one on the downstream side), tracer, radiographic imaging (e.g., identify two-phase vs. single-phase region of channels), an orifice plate (e.g., which may in some examples, be placed in front of one or more tube or channels), pitot tube, thermal conductivity flow meter, anemometer, and/or internal pressure flow profile.

Sensor data, process measurements, and/or calculations made using the sensor data or process measurements may be used to monitor and/or improve the performance of the equipment and parts making up the equipment. For example, sensor data may be used to detect that a desirable or an undesirable chemical reaction is taking place within a particular piece of equipment, and one or more actions may be taken to encourage or inhibit the chemical reaction. Chemical sensors may be used to detect the presence of one or more chemicals or components in the streams, such as corrosive species, oxygen, hydrogen, and/or water (moisture). Chemical sensors may utilize gas chromatographs, liquid chromatographs, distillation measurements, and/or octane measurements. In another example, equipment information, such as wear, efficiency, production, state, or other condition information, may be gathered and determined based on sensor data.

Sensor data may be collected continuously or at periodic intervals (e.g., every second, every five seconds, every ten seconds, every minute, every five minutes, every ten minutes, every hour, every two hours, every five hours, every twelve hours, every day, every other day, every week, every other week, every month, every other month, every six months, every year, or another interval). Data may be collected at different locations at different intervals. For example, data at a known problem area may be collected at a first interval, and data at a spot that is not a known problem area may be collected at a second interval. The data collection platform may continuously or periodically (e.g., every second, every minute, every hour, every day, once a week, once a month) transmit collected sensor data to interface module 24 via network 16, which may be nearby or remote from the one or more plants 12a-12n.

Corrective action may be taken based on determining this equipment information. For example, if the equipment is showing signs of wear or failure, corrective actions may be taken, such as taking an inventory of parts to ensure replacement parts are available, ordering replacement parts, and/or alerting repair personnel. Certain parts of equipment may be replaced immediately. Other parts may be safe to continue to use, but a monitoring schedule may be adjusted. Alternatively or additionally, one or more inputs or controls relating to a process may be adjusted as part of the corrective action.

The detection unit 22 may identify a causal relationship that leads to finding a root cause of chemical process disruptions and/or poor process operations. For example, the detection unit 22 may identify one or more operational issues or faulty conditions and prepare a systematic drill-down navigation to a set of potential root causes of the process disruptions and poor process operations.

Other illustrative plant management systems are disclosed in U.S. Patent Application Ser. Nos. 62/127,642, filed Mar. 3, 2015; 62/140,043, filed Mar. 30, 2015; 62/140,039, filed Mar. 30, 2015; 62/140,029, filed Mar. 30, 2015; Ser. No. 15/058,658, filed Mar. 2, 2016; Ser. No. 15/084,291, filed Mar. 29, 2016; Ser. No. 15/084,319, filed Mar. 29, 2016; and Ser. No. 15/084,237, filed Mar. 29, 2016, each of which is incorporated by reference in its entirety.

The diagnostic system 10 may include an interface module 24 for providing an interface between the diagnostic system 10, one or more internal or external databases 26, and the network 16. The interface module 24 may receive data from, for example, plant sensors and parameters via the network 16, and other related system devices, services, and applications. The other devices, services, and applications may include, but are not limited to, one or more software or hardware components related to the one or more plants 12a-12n. The interface module 24 may also receive the signals and/or parameters (e.g., provided from one or more sensors) from a plant of the one or more plants 12a-12n, which may be communicated to one or more respective units, modules, devices, and/or platforms.

The diagnostic system 10 may include an analysis unit 28 configured to determine an operating status of the refinery or petrochemical plant to ensure robust operation of the one or more plants 12a-12n. The analysis unit 28 may determine the operating status based on the readings of parameters or measurements gathered by one or more sensors at a plant of the one or more plants 12a-12n. The parameters or measurements may relate to at least one of a process model, a kinetic model, a parametric model, an analytical tool, a related knowledge standard, and/or a best practice standard.

In one or more embodiments, the analysis unit 28 may generate a comprehensive process decision tree based on at least one of an expert knowledge or a causal relationship between the faulty condition and the corresponding sensor signals, parameters, or measurements. Once the causal relationship is generated based on the decision tree, a human-machine interface (HMI) may be used to graphically link the faulty condition with the signals, parameters, or measurements. For example, high level process key performance indicators may be shown on the dashboard 32 and/or the display device 20.

For example, the analysis unit 28 may receive historical or current performance data from at least one plant of the one or more plants 12a-12n. The analysis unit 28 may use the historical or current performance data to proactively predict future events or actions. To predict various limits of a particular process and stay within the acceptable range of limits, the analysis unit 28 may determine target operational parameters of a final product based on one or more actual current operational parameters and/or one or more historical operational parameters (e.g., from a steam flow, a heater, a temperature set point, a pressure signal, and/or the like).

In using the kinetic model or other detailed calculations, the analysis unit 28 may establish one or more boundaries or thresholds of operating parameters based on existing limits and/or operating conditions. Illustrative existing limits may include mechanical pressures, temperature limits, hydraulic pressure limits, and/or operating lives of various components. Other suitable limits and conditions may suit different applications.

In using the knowledge and best practice standard, such as specific know-hows, the analysis unit 28 may establish relationships between operational parameters related to a specific process. For example, the boundaries on a naphtha reforming reactor inlet temperature may be dependent on a regenerator capacity and hydrogen-to-hydrocarbon ratio. Furthermore, the hydrogen-to-hydrocarbon ratio may be dependent on a recycle compressor capacity.

The diagnostic system 10 may include a visualization unit 30 configured to display plant performance variables using the display device 20. The visualization unit 30 may display a current state of the plant of the one or more plants 12a-12n using an alert dashboard 32 on the display device 20, grouping related data based on a source of the data for meaningfully illustrating relationships of the displayed data. In this configuration, the user quickly identifies the information, and effectively gains insightful interpretation presented by the displayed data.

In one or more embodiments, the diagnostic system 10 may interface with the network 16, and performs the performance analysis of a given plant of the one or more plants 12a-12n. The diagnostic system 10 manages interactions between the operators and the present system by way of the HMI, such as a keyboard, a touch sensitive pad, a touchscreen, a mouse, a trackball, a voice recognition system, and/or the like. Other suitable interactive interfaces may suit different applications.

The display device 20 (e.g., textual and graphical) may be configured to receive an input signal from the diagnostic system 10. In one or more embodiments, the system 10 may receive graphical and/or textual input or interactions from an input device, such as the HMI, using the alert dashboard 32. The signals and/or parameters may be received in the diagnostic system 10 and then transferred to the alert dashboard 32 of the display device 20 via a dedicated communication system.

The diagnostic system 10 may include an alert unit 34 configured to automatically generate a warning message based on the received signals, parameters, or measurements. Illustrative warning messages may include, but are not limited to, an email, a phone call, a text message, a voice message, an iMessage, an alert associated with a mobile application, or the like, such that selected technical service personnel and customers are informed of one or more faulty conditions of the specific chemical refining or petrochemical process.

FIG. 2A depicts an illustrative flow diagram of one or more processes in accordance with one or more embodiments of the present disclosure. One of skill in the art will recognize that the flow diagrams depicted throughout this disclosure may include one or more additional steps, repeat steps, may be performed without one or more steps, and/or may be performed in a different order than depicted.

Figure 2:
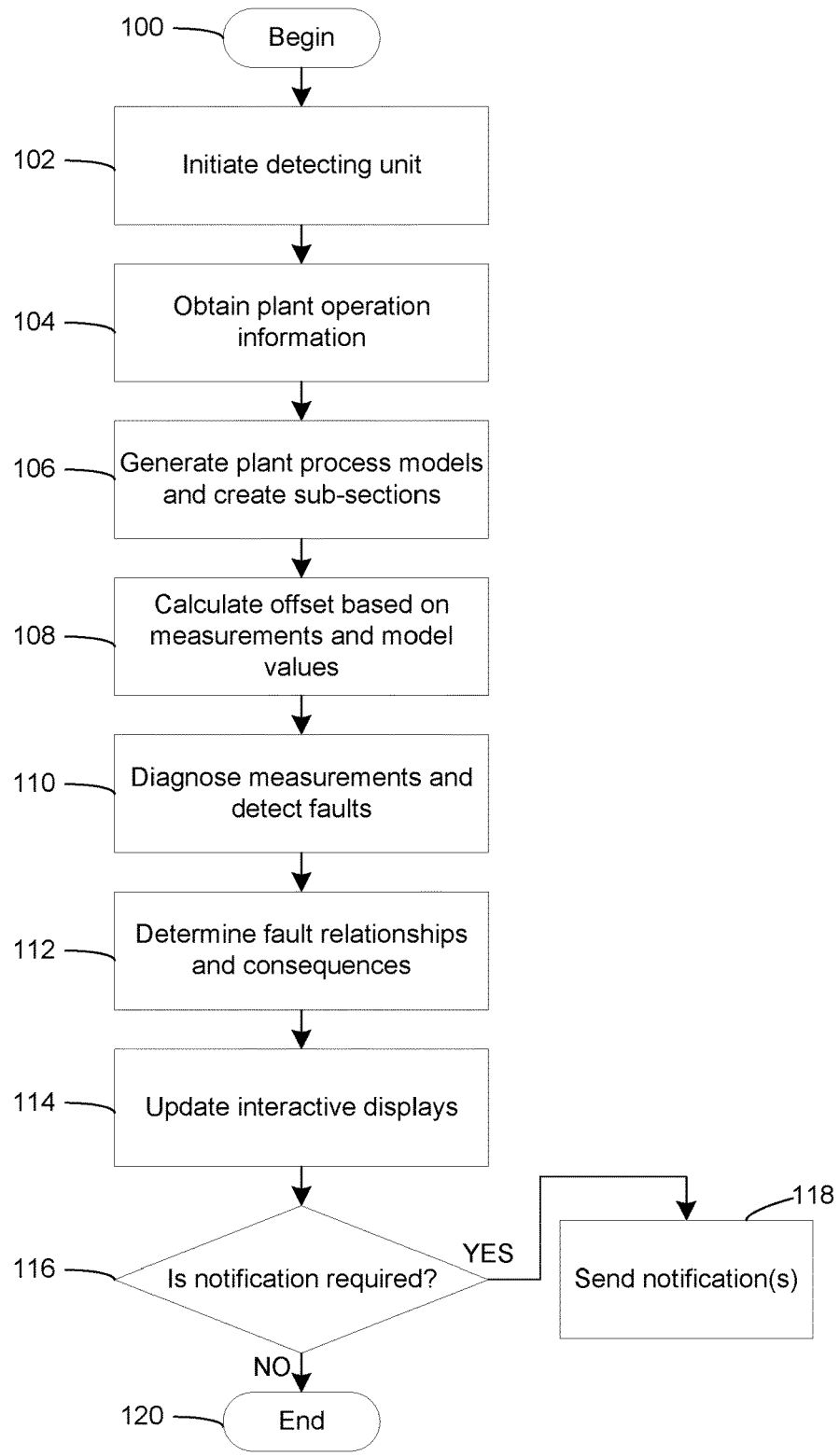
FIG. 2 depicts an illustrative flow diagram of processes in accordance with one or more embodiments of the present disclosure.

FIG. 2 depicts a flow diagram for an illustrative operation of the diagnostic system 10. In step 100, the method may begin.

In step 102, the method may initiate a detecting unit. For example, the detection unit 22 may be initiated by a computer system that is inside or remote from the plant 12a-12n. The method may be automatically performed by the computer system; however, the invention is not intended to be so limited. One or more steps may include manual operations or data inputs from the sensors and other related systems, as desired.

In step 104, the method may obtain plant operation information. In an example operation, the detection unit 22 may receive at least one set of actual measured data from the plant 12a-12n on a recurring basis at a specified time interval, such as, for example, every 100 milliseconds, every second, every ten seconds, every minute, every two minutes, etc. The received data may be analyzed for completeness and corrected for gross errors. Then, the data may be corrected for measurement issues (e.g., an accuracy problem for establishing a simulation steady state) and/or overall mass balance closure to generate a duplicate set of reconciled plant data.

In step 106, a plant process model may be generated using the plant operation information. The plant process model may estimate or predict plant performance that may be expected based upon the plant operation information. The plant process model results can be used to monitor the health of the plant 12a-12n and/or to determine whether any upset or poor measurement occurred. The plant process model may be generated by an iterative process that models various plant constraints to determine the desired plant process model.

The generated plant process model can further be divided into sub-sections, though this is not required in all methods. In an example method for creating sub-sections, a simulation may be used to model the operation of the plant 12a-12n. Because the simulation for the entire unit may be quite large and complex to solve in a reasonable amount of time, each plant 12a-12n may be divided into smaller virtual sub-sections, which may consist of related unit operations. An exemplary process simulation unit, such as a UNISIM® Design Suite, is disclosed in U.S. Patent Publication No. 2010/0262900, now U.S. Pat. No. 9,053,260, which is incorporated by reference in its entirety.

For example, in one or more embodiments, a fractionation column and its related equipment such as its condenser, receiver, reboiler, feed exchangers, and pumps may make up a sub-section. Some or all available plant data from the unit, including temperatures, pressures, flows, and/or laboratory data may be included in the simulation as Distributed Control System (DCS) variables. Multiple sets of the plant data may be compared against the process model, and model fitting parameter and measurement offsets may be calculated that generate the smallest errors.

In step 108, offsets may be calculated based on measurements and/or model values. Fit parameters or offsets that change by more than a predetermined threshold, and measurements that have more than a predetermined range of error, may trigger further action. For example, large changes in offsets or fit parameters may indicate the model tuning may be inadequate. Overall data quality for the set of data may then be flagged as questionable.

More specifically, a measured value and corresponding simulated value may be evaluated for detecting an error based on a corresponding offset. In one or more embodiments, an offset may be detected when the measured information is not in sync with the simulated information. The system may use evidence from a number of measurements and a process model to determine the simulated information.

As an example only, consider the following measurements: a feed with the composition of 50% component A and 50% component B and a flow of 200 pounds per hour (90.7 kg/hr) and two product streams, the first with a composition 99% component A and a flow of 100 pounds per hour (45.3 kg/hr) and the second with a composition of 99% component B and 95 pounds per hour (43.1 kg/hr). Based on the first-principles model, the total feed must equal the total product, and the total amount of A or B in the feed must equal the total amount of A or B in the product. The expected flow of the second product stream would be 100 pounds per hour (45.3 kg/hr) and the system may therefore assess that the offset between the measurement and simulation is 5 pounds per hour (2.27 kg/hr).

In step 110, the operational status of the measurements may be diagnosed, e.g., based on at least one environmental factor, and a fault (or faults) may be detected by the detection unit 22. As discussed elsewhere herein, the example diagnostic system 10 may use one or more different models to determine the status of the plant and the presence of operating conditions that may be considered faults. A model used for detecting the faults can be a heuristic model, an analytical model, a statistical model, etc. In one or more example methods, the calculated offset between the feed and product information may be evaluated based on at least one environmental factor for detecting the fault of a specific measurement.

Next, in step 112, the analysis unit 28 may determine fault relationships and consequences. Relationships between the faults can be determined from, for instance, expert knowledge, statistical analysis, or machine learning. In one or more embodiments, the analysis unit 28 may generate a comprehensive process decision tree based on at least one of an expert knowledge or a causal relationship between the faulty condition and the corresponding sensor signals, parameters, or measurements.

For example, the analysis unit 28 can receive historical or current performance data from at least one of the plants 12a-12n to proactively predict future actions to be performed. To predict various limits of a particular process and stay within the acceptable range of limits, the analysis unit 28 may determine target operational parameters of a final product based on actual current and/or historical operational parameters, e.g., from a steam flow, a heater, a temperature set point, a pressure signal, or the like.

In using the kinetic model or other detailed calculations, the analysis unit 28 may establish boundaries or thresholds of operating parameters based on existing limits and/or operating conditions. Illustrative existing limits may include mechanical pressures, temperature limits, hydraulic pressure limits, and/or operating lives of various components. Other suitable limits and conditions are contemplated to suit different applications.

In using the knowledge and best practice standard, such as specific know-hows, the analysis unit 28 may establish relationships between operational parameters related to the specific process. For example, the boundaries on a naphtha reforming reactor inlet temperature may be dependent on a regenerator capacity and hydrogen-to-hydrocarbon ratio, which itself may be dependent on a recycle compressor capacity.

Next, in step 114, the visualization unit 30 may cause one or more displays, such as the display device 20, to be updated. The display device 20 may be configured for graphically linking the faulty condition detected by the detection unit 22 with the plurality of readings of parameters or measurements. The visualization unit 30 may display a current state of the plant 12a-12n, e.g., the operating status of the plant with the readings of parameters or measurements, using an alert dashboard 32 on the display device 20, grouping related data based on a source of the data for meaningfully illustrating relationships of the displayed data.

The visualization unit 30 may update one or more screens of the display device 20 with context information that is provided by diagnosing measurements and detecting faults (step 110) and by determining fault relationships and consequences (step 112). For example, once the causal relationship is generated based on the decision tree, a human machine interface (HMI) may be used to graphically link the faulty condition with the signals, parameters, or measurements. In some example methods, high level process key performance indicators (KPI) may be shown on the display device 20. If the diagnostic system 10 determines that conditions exist that might cause a key performance indicator to eventually be put at risk, the updated display devices 20 may indicate this information, provide context for what variables or factors are presenting this risk, and/or provide advice as to how to address the risk. In this configuration, a user may quickly identify the information, and effectively gain insightful interpretation presented by the displayed data.

In one or more embodiments, the diagnostic system 10 may interface with the network 16, and performs the performance analysis of the given plant 12a-12n. The diagnostic system 10 may manage interactions between the operators and the present system by way of the HMI, such as a keyboard, a touch sensitive pad or screen, a mouse, a trackball, a voice recognition system, and the like. Other suitable interactive interfaces are contemplated to suit different applications.

In some embodiments, the display device 20 (e.g., textual and graphical) may be configured for receiving an input signal from an input device and/or the diagnostic system 10. In one embodiment, display may receive input from an input device, such as the HMI, the input indicating a graphical or textual interaction with the present system 10, via the alert dashboard 32. The signals and/or parameters may be generally received in the diagnostic system 10 and then transferred to the alert dashboard 32 of the display device 20 via a dedicated communication system.

The diagnostic system 10 may determine at step 116 whether to send one or more notifications. In one or more example embodiments, the diagnostic system 10 can be configured to set up notifications to individual users. Alternatively or additionally, users can subscribe to notifications.

If a measurement is determined to be within a fault status, a notification (e.g., an alert) may be sent to a user device (e.g., of an operator) at step 118. The diagnostic system 10 may include an alert unit 34 configured for automatically generating alerts such as a warning message for the operators and/or other related systems coupled to the present system based on the received signals, parameters, or measurements. Exemplary warning messages may include, but are not limited to, an email, a text message, a voice message, an iMessage, a smartphone alert, a notification from a mobile application, or the like. The alert may provide information related to one or more faulty conditions of the specific chemical refining or petrochemical process.

After the notification is sent (step 118), or if no notification is required (step 116), the method ends at step 120. The method may be repeated as needed.

Referring now to FIGS. 3A-3F, an illustrative benzene toluene xylene aromatics production complex alert dashboard, using hue and color techniques, is shown to interpolate color indications and other signals for the plant parameters. The visualization unit 30 may create an interactive and visually engaging display for the alert dashboard 32. An aspect of the dashboard 32 may include an "at-a-glance" graphical presentation for drawing adequate attention to important parameters, and insight into their meanings based on the hue and color techniques.

In one or more embodiments, other suitable visualization techniques having visual indicators may be used to readily discriminate the quality of displayed data on the alert dashboard 32. Specifically, the visualization unit 30 may provide a hierarchical structure of detailed explanation on the individual parameters shown on the alert dashboard 32. The hierarchical structure may include or be associated with multiple levels, windows, subscreens, or the like, such that a visualization of the data may be selectively expanded, or a particular level of the individual parameters may be drilled down into.

As described in greater detail below, to achieve the drill-down navigation, selectively clicking on a warning button 36 in the initial screen using a cursor of a positional device (e.g., a mouse) may start and open up a new display window or pane with more detailed information about the warning. Other graphical icons, such as a number 37A or a confidence button 37B, may be selected or clicked to perform the drill-down navigation. Other similar methods may suit different applications. Further clicking on a corresponding display item may generate more information. Other cursor movements of the positional device, such as roll-over or mouse-hover techniques, may activate the warning button 36.

Figure 3A:
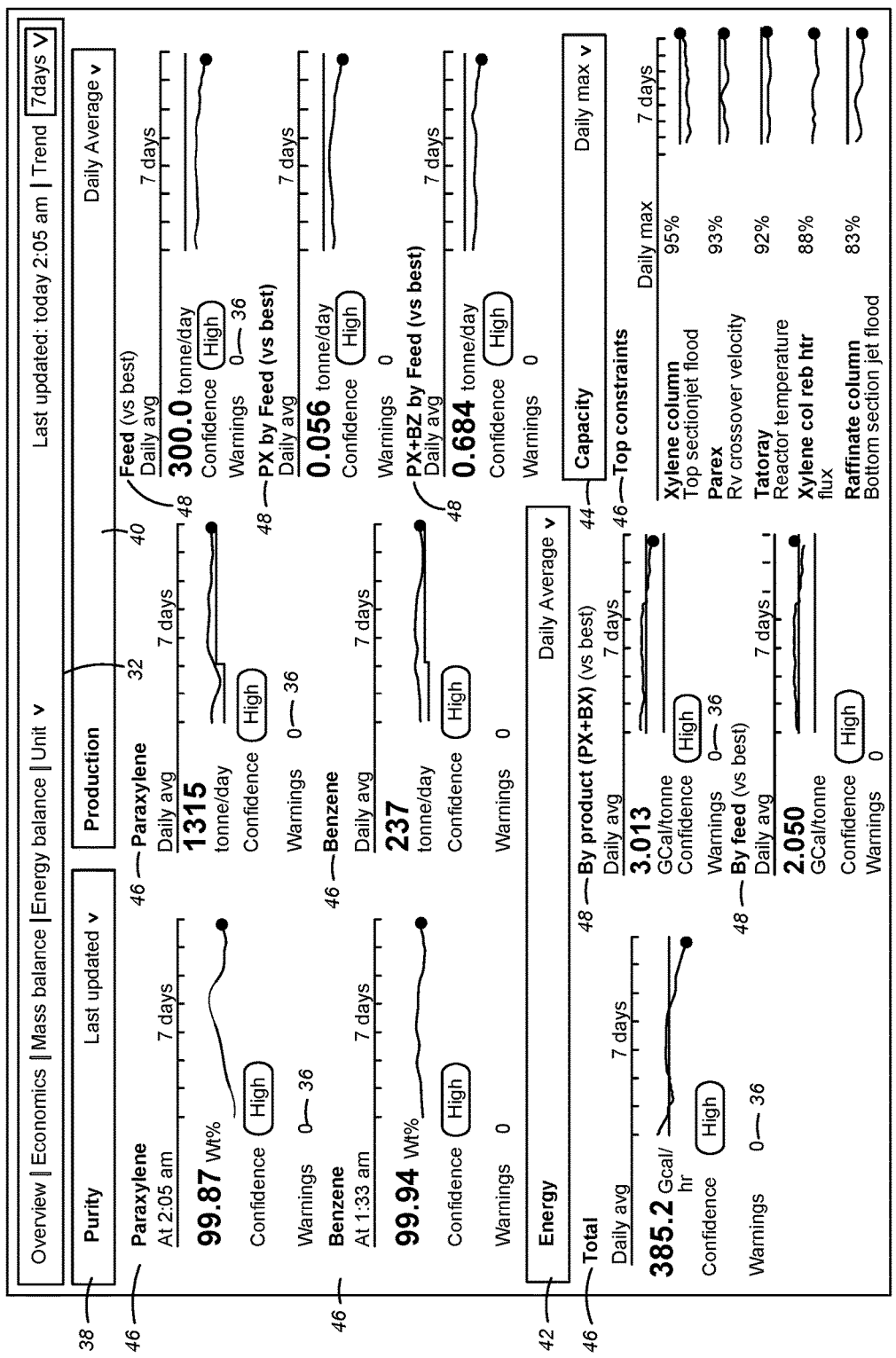
FIGS. 3A-3F depict an illustrative benzene toluene xylene aromatics production complex alert dashboard used in a diagnostic system for displaying hierarchical diagnostic data in accordance with one or more embodiments of the present disclosure.

In this example, the visualization unit 30 may display one or more parameters related to a benzene toluene xylene aromatics production complex or process. FIG. 3A depicts an illustrative aromatics alert dashboard 32 illustrating high-level process effectiveness calculations and energy efficiency parameters of the plant 12*a* along with important operating limits. The operating limits may be adaptive or adjustable depending on which parameters are the closest to their limits. For example, each graphical scale or presentation 39 of a corresponding parameter, such as paraxylene or benzene, may be adjustable or adaptable in size based on its minimum and maximum values relative to a predetermined time period. More specifically, the operating limits may be displayed based on at least one of the operational parameters, such as yields and losses, an energy efficiency, operational thresholds, operational limits, a process efficiency, a process purity, and/or the like. Other suitable parameters may suit the application.

An aspect of the alert dashboard 32 may include approximately one or more (e.g., three or four) window sections (or boxes), each of which includes one or more (e.g., one, two, three, four) primary component sub-window sections (or boxes) or one or more (e.g., one, two, three, or four) secondary component sub-window sections (or boxes), or a combination of one or more (e.g., one, two, three, four) primary and one or more (e.g., one, two, three, four) secondary components in a predetermined standardized window configuration. As an example only, as depicted in FIG. 3A, four windows sections are displayed in the alert dashboard 32. Specifically, FIG. 3A depicts a PURITY window section 38, a PRODUCTION window section 40, an ENERGY window section 42, and a CAPACITY window section 44. Other suitable combination of primary and/or secondary components may suit different applications.

A specific location of each window section 38, 40, 42, 44 in the alert dashboard 32 may signify a priority level of importance relative to the other window sections. In the example depicted in FIG. 3A, the PURITY window section 38 located in a left top (or upper left) quadrant of the dashboard 32 may be the most important section for the aromatics process. The PRODUCTION window section 40 located in a right top (or upper right) quadrant of the dashboard 32 may be the second important section for the aromatics process. The ENERGY window section 42 located in a left bottom (or lower left) quadrant of the dashboard 32 may be the third important section for the aromatics process. The CAPACITY window section 44 located in a right bottom (or lower right) quadrant of the dashboard 32 may be the fourth important section (e.g., the least important section) for the aromatics process.

In the example depicted in FIG. 3A, in the PURITY window section 38, two primary component sub-window sections or boxes 46 may be displayed (e.g., for paraxylene and benzene). The primary component sub-window sections or boxes 46 of the PURITY window section 38 may correspond to products produced by a process. The primary component sub-window sections or boxes 46 of the PURITY window section 38 may depict a purity rating for a product produced by the process. The primary component sub-window sections or boxes 46 of the PURITY window section 38 may include a real-time or most-recent number (e.g., Wt %) associated with a purity of the product. The primary component sub-window sections or boxes 46 of the PURITY window section 38 may include an indication of a time of the real-time or most-recent number associated with the purity of the product. The primary component sub-window sections or boxes 46 of the PURITY window section 38 may include a graph that shows the purity of the product over a time period (e.g., a most recent hour, two hours, four hours, 12 hours, day, two days, three days, four days, five days, six days, week, two weeks, month, or the like). The primary component sub-window sections or boxes 46 of the PURITY window section 38 may include a confidence rating (e.g., low, medium, high) corresponding to a confidence of the purity of the product.

In the example depicted in FIG. 3A, in the PRODUCTION window section 40, in addition to the two primary component sub-window sections 46, three secondary component sub-window sections 48 may be displayed for feed, paraxylene by feed, and paraxylene+benzene by feed. The primary component sub-window sections 46 of the PRODUCTION window section 40 may correspond to products produced by a process. The primary component sub-window sections 46 of the PRODUCTION window section 40 may depict a production level for a product produced by the process. The primary component sub-window sections 46 of the PRODUCTION window section 40 may include a real-time or most-recent number (e.g., tonne/day) associated with the production level of the product. The primary component sub-window sections 46 of the PRODUCTION window section 40 may include a graph that shows the production level of the product over a time period (e.g., an average over a most recent hour, two hours, four hours, 12 hours, day, two days, three days, four days, five days, six days, week, two weeks, month, or the like). The primary component sub-window sections 46 of the PRODUCTION window section 40 may include a confidence rating (e.g., low, medium, high) corresponding to a confidence of the production level of the product.

In the example depicted in FIG. 3A, the ENERGY window section 42 may include one primary component sub-window section 46 for a total energy, and two secondary component sub-window sections 48 for product and feed. The primary component sub-window section 46 of the ENERGY window section 42 may correspond to a total energy associated with a process. The primary component sub-window section 46 of the ENERGY window section 42 may depict an energy level associated the process. The primary component sub-window section 46 of the ENERGY window section 42 may include a real-time or most-recent number (e.g., GCal/hr) associated with the energy level. The primary component sub-window section 46 of the ENERGY window section 42 may include a graph that shows the energy level over a time period (e.g., an average over a most recent hour, two hours, four hours, 12 hours, day, two days, three days, four days, five days, six days, week, two weeks, month, or the like). The graph may include a line indicating a design level. The primary component sub-window section 46 of the ENERGY window section 42 may include a confidence rating (e.g., low, medium, high) corresponding to a confidence of the energy level.

In the example depicted in FIG. 3A, in the CAPACITY window section 44, one primary component sub-window section 46 may be displayed for top constraints. The primary component sub-window sections 46 of the CAPACITY window section 44 may correspond to top constraints associated with a process. The primary component sub-window sections 46 of the CAPACITY window section 44 may include a list of the top constraints associated with the process. For example, as depicted in FIG. 3A, the top constrains may include xylene column top sectionjet flood, parex ry crossover velocity, tatoray reactor temperature, xylene col reb htr flux, and/or raffinate column bottom section jet flood, The primary component sub-window sections 46 of the CAPACITY window section 44 may include a daily max (e.g., percentage) associated with each of the top constraints associated with the process. The primary component sub-window sections 46 of the CAPACITY window section 44 may include one or more graphs that show the limits of the top constraints associated with the process over a time period (e.g., a most recent hour, two hours, four hours, 12 hours, day, two days, three days, four days, five days, six days, week, two weeks, month, or the like). One or more of the graphs may include a line indicating a design level.

In each of the window sections 38, 40, 42, and 44, each primary component sub-window section 46 may have only one component of the corresponding process, showing a single measurement with related information about the component, or may have two or more components showing a plurality of measurements with the corresponding information for each component. An illustrative arrangement of the sub-window section 46 may include a primary component having three measurements, and a larger primary component (e.g., equal to the height of two primary components) having four measurements. Other suitable arrangements may suit different applications. The alert dashboard 32 may include a total of a number (e.g., three) of columns and a number (e.g., four or five) rows of information for the primary component sub-window sections 46 and the secondary component sub-window sections 48. Each window sections 38, 40, 42, 44, and its corresponding sub-window sections 46, 48 may include a warning button 36, respectively. The warning button 36 may, when selected, cause display of hierarchical diagnostic data related to each component. Other suitable arrangements of the columns and rows may be used, depending on sizes of the display device 20 and the dashboard 32.

In one or more embodiments, warning button 36 may be activated or displayed based on an information type of each component. For example, a secondary component (e.g., Info Type) may be used to display measures that are not connected to the fault model, and may provide context to other components that are connected to the fault model. As such, the measurement number and the Current Value dot at the end of the trend line may be displayed visually in a particular color (e.g., gray). In one or more embodiments, the secondary component may be the Info Type, and the primary components may be connected to the fault model. Thus, when the corresponding component may be the Info Type, this component might not have the warning button 36 (e.g., because there might not be troubleshooting information to be accessed).

Figure 3B:
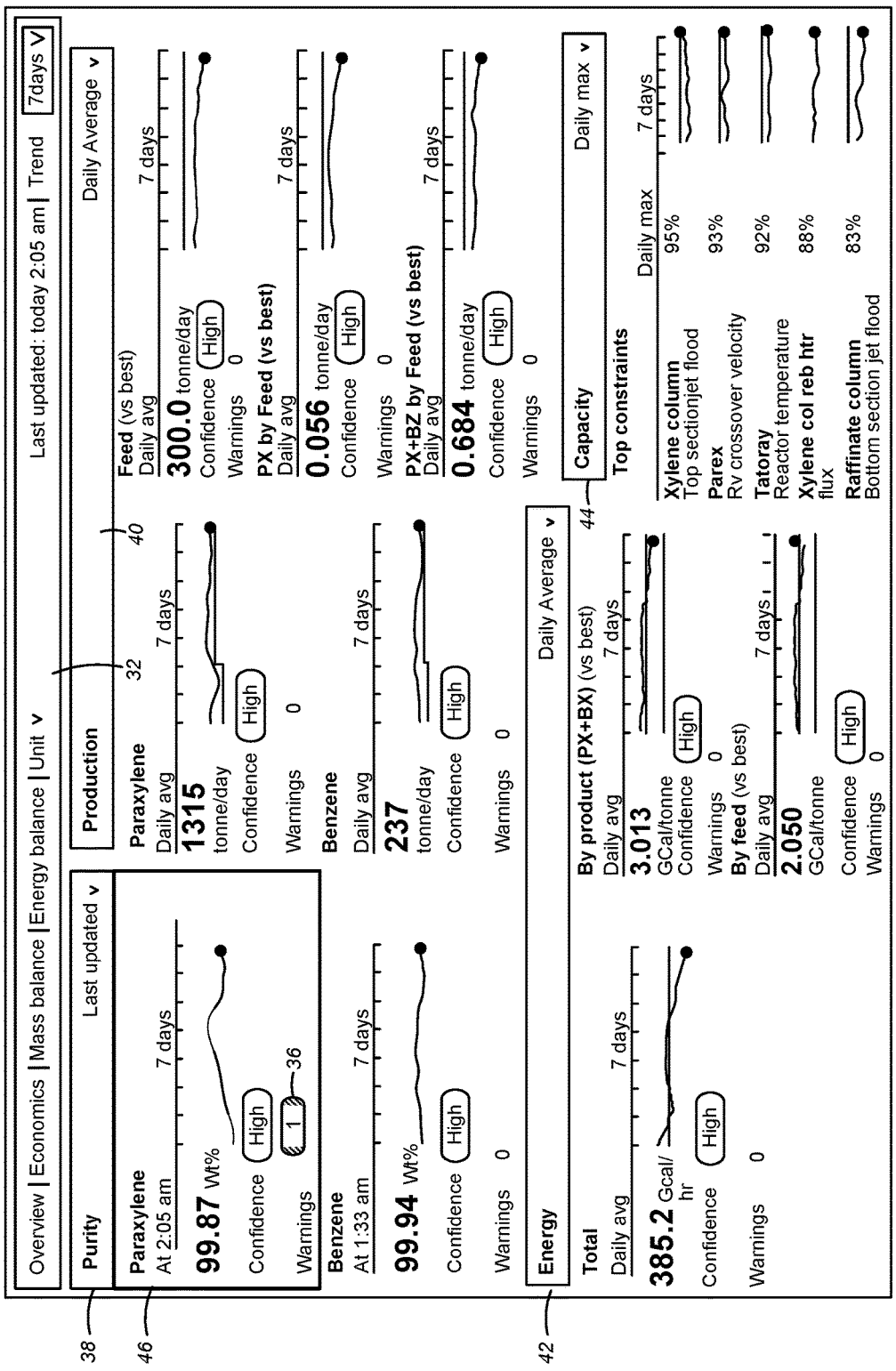

In this example, as illustrated in FIG. 3B, when the detection unit 22 detects at least one faulty condition in the paraxylene component sub-window section 46 of the PURITY window section 38 for the aromatics alert dashboard 32, a color of the warning button 36 may indicate or be associated with a severity level of the associated warning. In some embodiments, the warning button 36 may include a numerical indicator showing a total number (e.g., 1, 2, 3) of faulty conditions related to the paraxylene component of the aromatics process.

For example, a first color (e.g., RED) may be used for critical warnings associated with the parameter values of sensors operating out of a predetermined range (e.g., minimum or maximum values). A second color (e.g., YELLOW or AMBER) may be used for cautionary warnings associated with the parameter values of sensors operating within the predetermined range but out of a normal operative range. A third color (e.g., GREEN) may be used to indicate that the parameter values are operating within a normal operative range. A fourth color may be used to indicate another status (e.g., the parameter values operating within another range).

In one or more embodiments, the first color (e.g., RED) may indicate the faulty condition in a parent or top level of a corresponding hierarchical fault model, and the second color (e.g., YELLOW or AMBER) may indicate the faulty condition in a child or lower level of the corresponding hierarchical fault model. As an example only, when the measure in the key performance indicator component itself is in fault, a related graphical representation, such as a corresponding parameter value 37A or a dot 37C at an end of a trend line 39, and a portion of the trend line where the measurement is in fault, may be displayed using the first color (e.g., RED). But when the lower level is in the faulty condition, the associated faulty items may be displayed using the second color (e.g., YELLOW or AMBER). In this case, a value in the warning button 36 may show "1" or a higher number, indicating that there are one or more faulty conditions in the lower level, but if the key performance indicator measure itself (e.g., PURITY) is not in the faulty condition, all parent items may be displayed in the second color (e.g., YELLOW or AMBER) instead of the first color (e.g., RED). Other different uses of the color schemes may suit different applications.

Figure 3C:
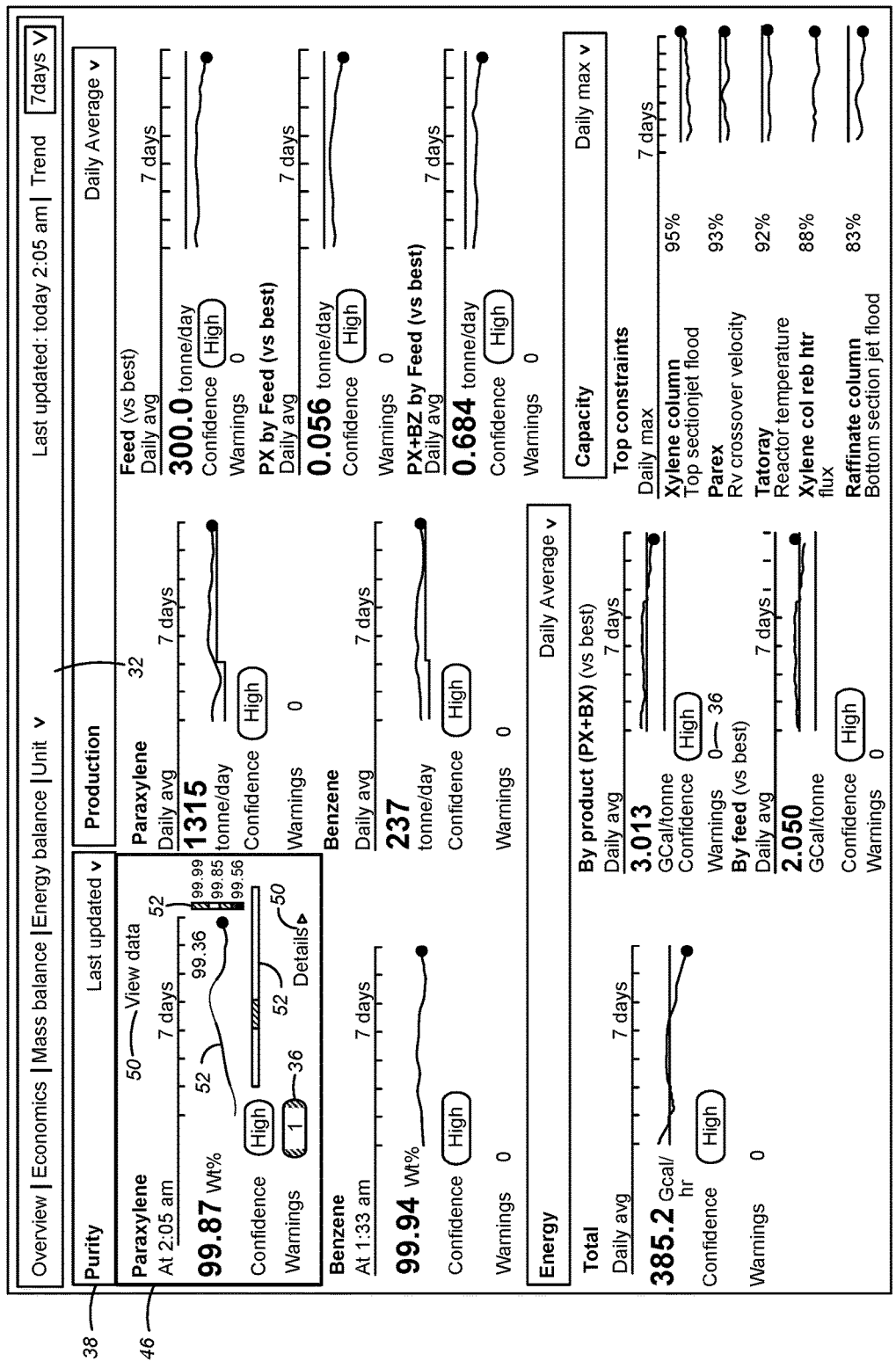

In FIG. 3C, when the warning button 36 having the numerical indicator showing "1" is selected or clicked, a view data or detail button 50 may be disposed in the paraxylene component sub-window section 46. In one or more embodiments, the view data or detail button 50 may include a function to selectively download or upload the data displayed in the sub-window section 46 for importing the data into other software programs (e.g., spreadsheet software or word-processing software). In one or more embodiment, a feature for downloading additional pre-defined sets of related data may be incorporated into the functionality of the view data or detail button 50. The download feature may be incorporated into a separate button or graphical representation to suit different applications. In some embodiments, a user-defined set of data may be downloaded or uploaded.

In one or more embodiments, at least one graphical representation 52 may be provided, which may be designed for illustrating changes in a component (e.g., the paraxylene component) during a sampling period. In some embodiments, the sampling period may be predetermined.

A faulty condition of the component may be indicated using color and hue techniques. For example, a color and/or hue of the graphical representation may correspond to a fault condition. A first color and/or hue may correspond to a first fault condition, a second color and/or hue may correspond to a second fault condition, a third color and/or hue may correspond to a third fault condition, and so on.

In some embodiments, the displayed graphical representation 52 may include time-based information in the form of miniature trends adjacent to associated parameter values.

In one or more embodiments, additional informational lines may be displayed with the trend lines. For example, a line with a first color (e.g., gray) and a first pattern (e.g., a stepped line) in the paraxylene and benzene Production components may represent a desired target for that measurement. Alternatively, a second line in a second color (e.g., green) and a second pattern (e.g., a straight line) in other boxes in the Production section may represent a previous "best" performance for that measurement over a set period of time.

In this example, the graphic representation 52 may include the sampling period of a particular time period (e.g., seven days), but other sampling periods, such as 3 days or 30 days, may also or alternatively suit the application.

Figure 3D:
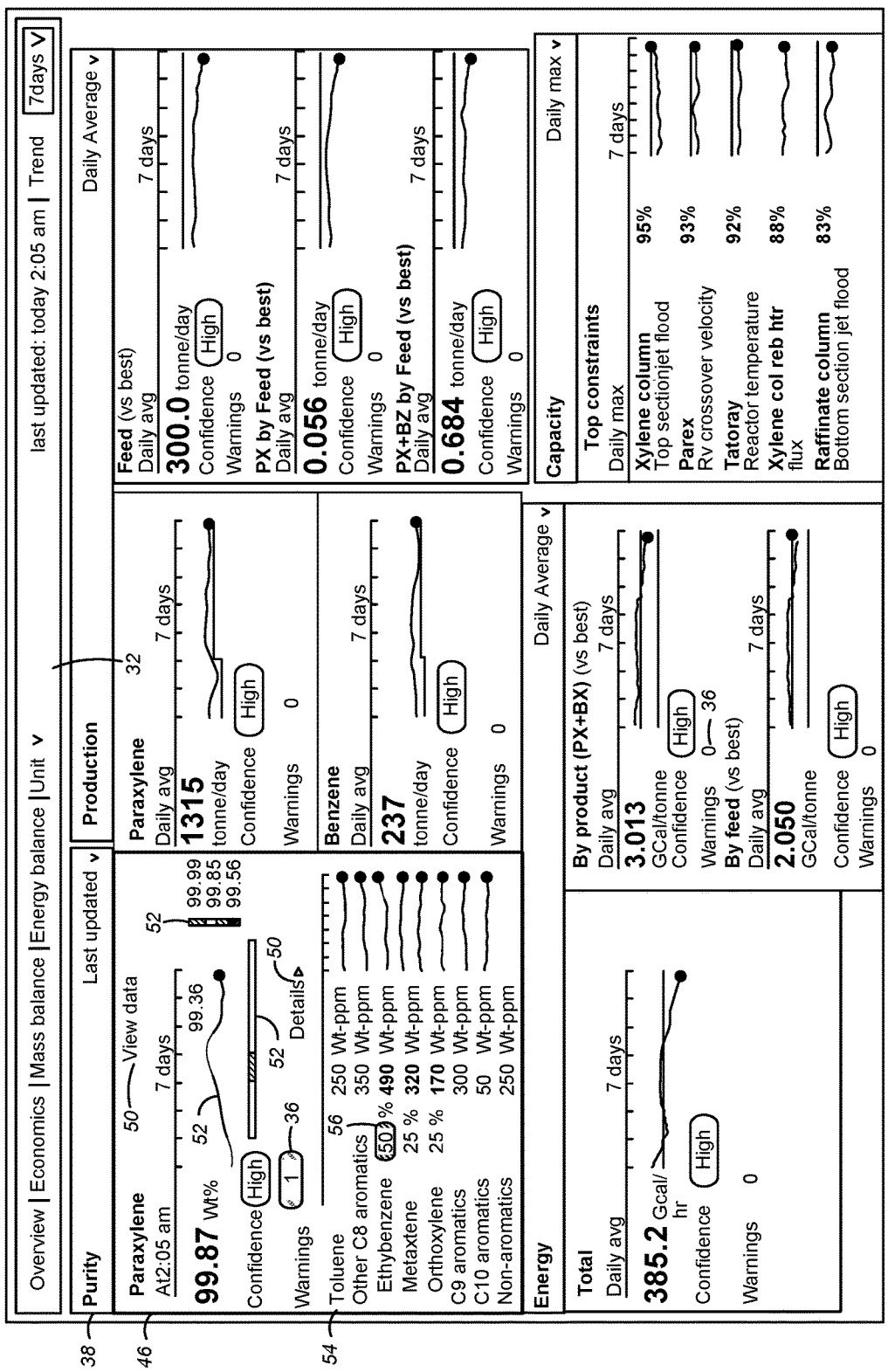

In some embodiments, when the view data or detail button 50 is activated, the paraxylene component sub-window section 46 may automatically expand to create a detail pane 54 as depicted in FIG. 3D. The detail pane 54 may display detailed data related to the faulty conditions. In this example, the paraxylene component sub-window section 46 may expand downwardly to show sublevel display items in the detail pane 54, featuring one or more impurity components related to the paraxylene purity.

Specifically, the parameter values associated with Toluene, C8 Aromatics, C9 Aromatics, C10 Aromatics, and Non-Aromatics are shown in the detail pane 54 of the sub-window section 46. Other suitable parameter values may also or alternatively suit different applications, for example, component yields and losses, an energy efficiency, operational limits, speed limits or flow rates, and a process efficiency, and the like. Utility inputs and outputs, such as steam, gas, and electricity, and utility outputs, may also be displayed in the alert dashboard 32 as desired.

As discussed above, when the detection unit 22 identifies the faulty conditions, the systematic drill-down navigation may be performed to identify the set of potential root causes of the process disruptions and poor process operations. In this example, the ethylbenzene component may be identified as the root cause of the faulty condition because a component ratio of ethylbenzene may be increased to a particular percentage (e.g., 50 percent) when compared to the ratio measured previously (e.g., two days ago).

Figure 3E:
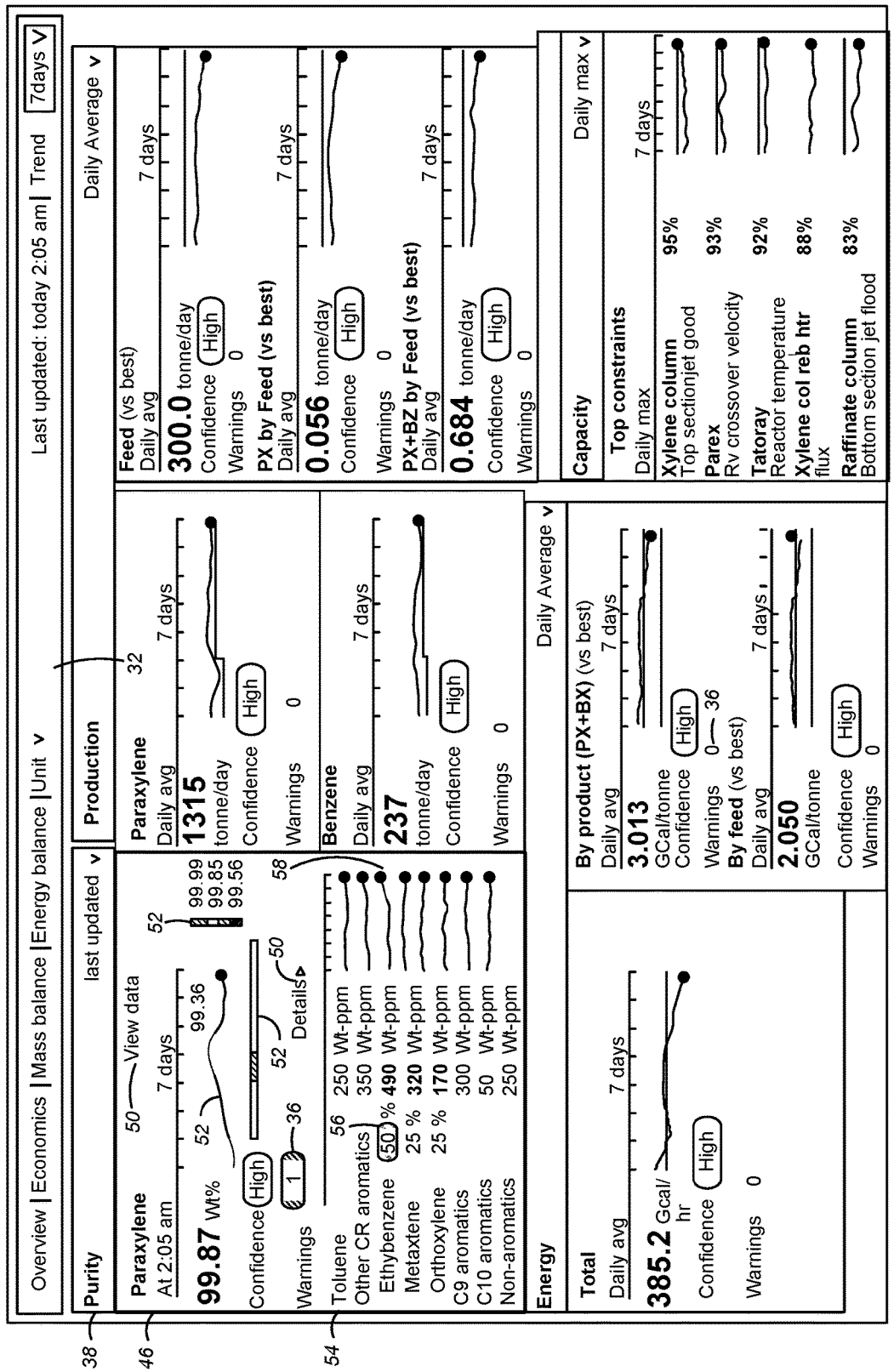

As depicted in FIG. 3E, for a particular sublevel display item (e.g., ethylbenzene), a warning marker 56 may be displayed to readily identify the root cause of the faulty condition. The sublevel display item having the warning marker 56 may be highlighted in a different color (e.g., gray or blue) to distinguish the item from background.

An arrow button 58 may be provided for navigating downwardly to and automatically creating an action pane 60 (FIG. 3F) having more detailed descriptions about the corresponding higher level display item. Additional drill-down navigations, and conversely, upward navigations to the corresponding higher level display items, may additionally or alternatively suit the application.

In another embodiment, the drill-down navigation capability may be incorporated into any other graphical representation, such as the number 37A, the confidence button 37B, or the warning button 36, to display the more detailed descriptions. The remaining features of this depicted embodiment are the same or similar to the preceding embodiment(s) described in more detail above and the same reference numbers are used. Those portions of the preceding embodiment(s) relating to the remaining features are incorporated by reference herein. While all boxes, windows, and panes are shown on the same dashboard, other supplemental display configurations, such as independent pop-up windows and semi-transparent layered boxes, may be used.

Figure 3F:
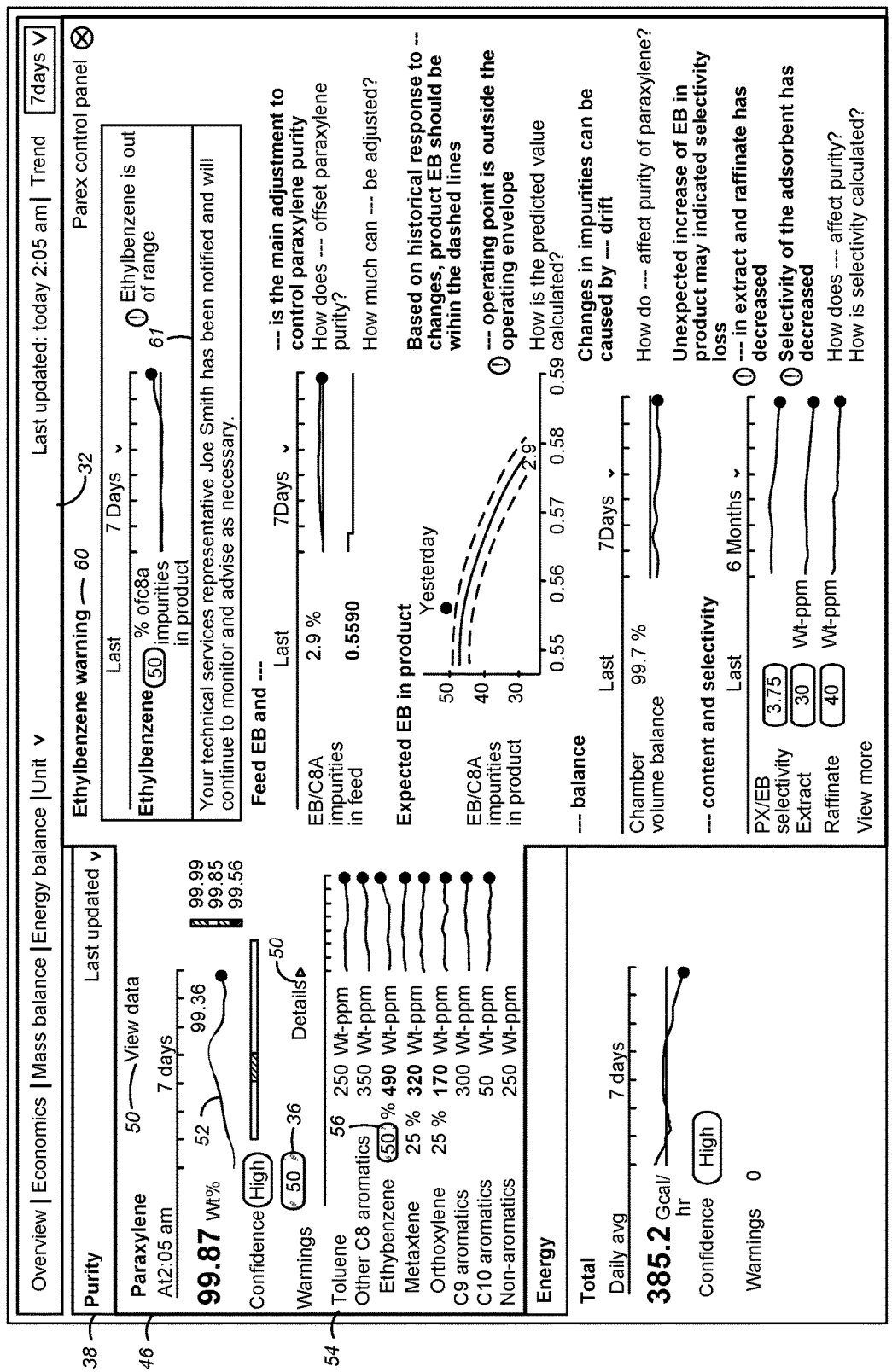

In FIG. 3F, when the arrow button 58 is selected or clicked, the action pane 60 may be displayed for illustrating the detailed information about the ethylbenzene component shown in the detail pane 54. In this example, the action pane 60 may include an ethylbenzene warning describing the faulty condition of C8 Aromatics impurities in end products.

In another embodiment, another graphical representation, such as the number 37A, the confidence button 37B, or the warning button 36, may be selected or clicked to illustrate the detailed information in a separate screen or window.

As the component ratio of ethylbenzene exceeds a predetermined threshold and thus is out of range, the alert unit 34 notifies a specific technical service representative for further analysis, which may be indicated in the action pane 60 via a notification display 61. In the meantime, the present system 10 may continue to monitor the aromatics process, and/or may provide additional advice, alerts, warnings, or the like as needed.

The standardized display configuration for the alert dashboard 32 may establish links between processes and faulty conditions. As process, analytical, and/or other data may be used to provide reports that are linked through process and reference models, one or more operators may effectively communicate and make decisions from a common set of information, thereby driving a whole organization associated with a plant or refinery to focus on continuous performance maximization.

Figure 4A:
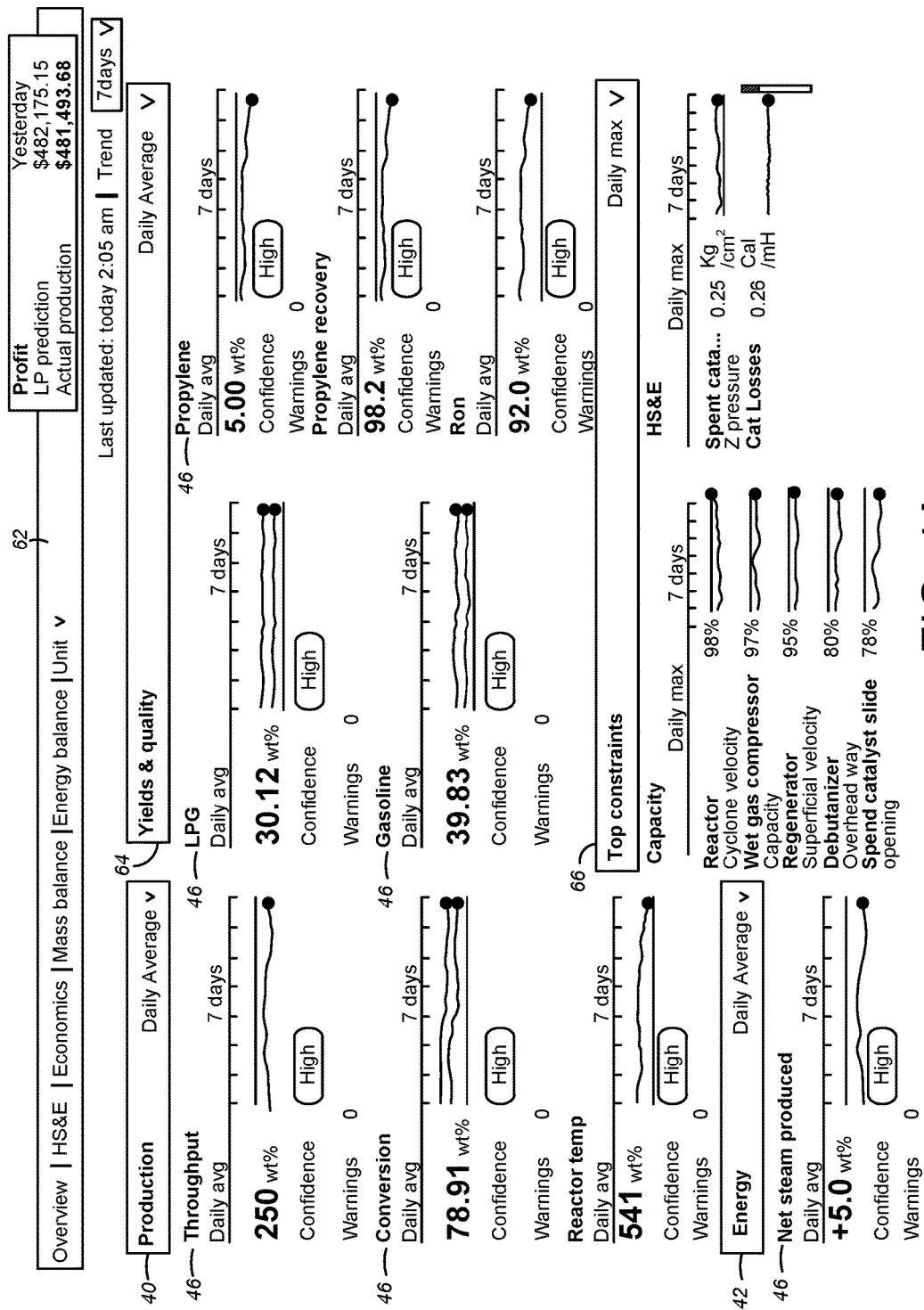
FIGS. 4A-4E depict an illustrative fluid catalytic cracking process key performance indicator alert dashboard used in the present diagnostic system for displaying hierarchical diagnostic data in accordance with one or more embodiments of the present disclosure.

Referring now to FIGS. 4A-4E, an illustrative fluid catalytic cracking key performance indicator alert dashboard 62 is depicted. As depicted in FIG. 4A, an overall configuration of the fluid catalytic cracking key performance indicator alert dashboard 62 may be similar to the aromatics alert dashboard 32 depicted in FIGS. 3A-3F. But in this example, as depicted in FIG. 4A, the PRODUCTION window section 40 may be displayed in a left top quadrant of the dashboard 62 to signify that production may have a highest priority level of importance for the fluid catalytic cracking chemical process.

As depicted in FIG. 4A, a YIELDS & QUALITY window section 64 may be disposed in a right top quadrant of the dashboard 62, which may signify that yields and quality are a second important section for the fluid catalytic cracking chemical process. As depicted in FIG. 4A, a ENERGY window section 42 may be disposed in a left bottom quadrant of the dashboard 62, which may signify that energy is a third important section for the fluid catalytic cracking chemical process. As depicted in FIG. 4A, a TOP CONSTRAINTS window section 66 may be disposed in a right bottom quadrant of the dashboard, which may signify that top constraints are a least important section for the fluid catalytic cracking chemical process.

Figure 4B:
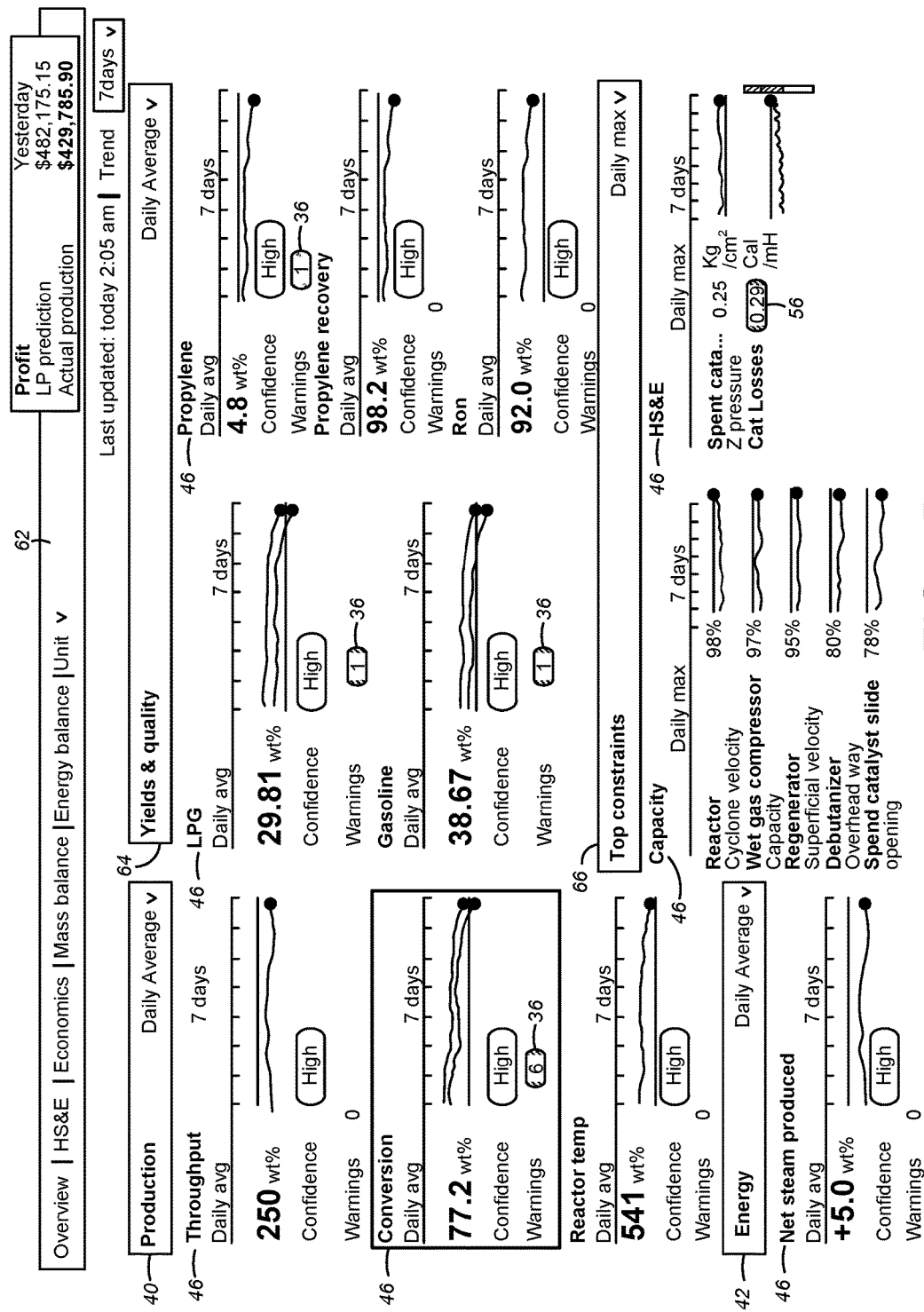

As depicted in FIG. 4B, the warning button 36 in the conversion component sub-window section 46 may indicate one or more (e.g., six) critical level warnings. Similarly, the warning button 36 in a liquid propane gas (LPG) sub-window section 46 may indicate one or more (e.g., one) critical level warnings, and the warning button in a gasoline sub-window section may indicate one or more (e.g., one) critical level warnings. Also, the warning button 36 in a propylene sub-window section 46 may indicate one or more (e.g., one) cautionary level warnings, and the warning marker 56 in a health safety and environment (HS&E) sub-window section 46 may indicate one or more (e.g., one) cautionary level warning. In one or more embodiments, the cautionary level warning may refer to a warning condition not indicative of the faulty condition illustrated in a first color (e.g., RED) or a second color (e.g., YELLOW or AMBER). Rather, the cautionary level warning may indicate a warning level of the faulty condition between the first color (e.g., RED) and the second color (e.g., YELLOW or AMBER). In another embodiment, a view-all button may be provided in the sub-window section 46—or any other suitable portion of the dashboard 62—to display some or all related information associated with the corresponding parameter values in a same or separate screen or window.

In this example, there may be one or more (e.g., two) levels of warnings, such as the critical level warning and/or the cautionary level warning. The critical level warning may be associated with a first color (e.g., RED), and the cautionary level warning may be associated with a second color (e.g., YELLOW). The first color (e.g., RED) may signify a higher level of priority, and the second color (e.g., YELLOW) may signify a lower level of priority.

Figure 4C:
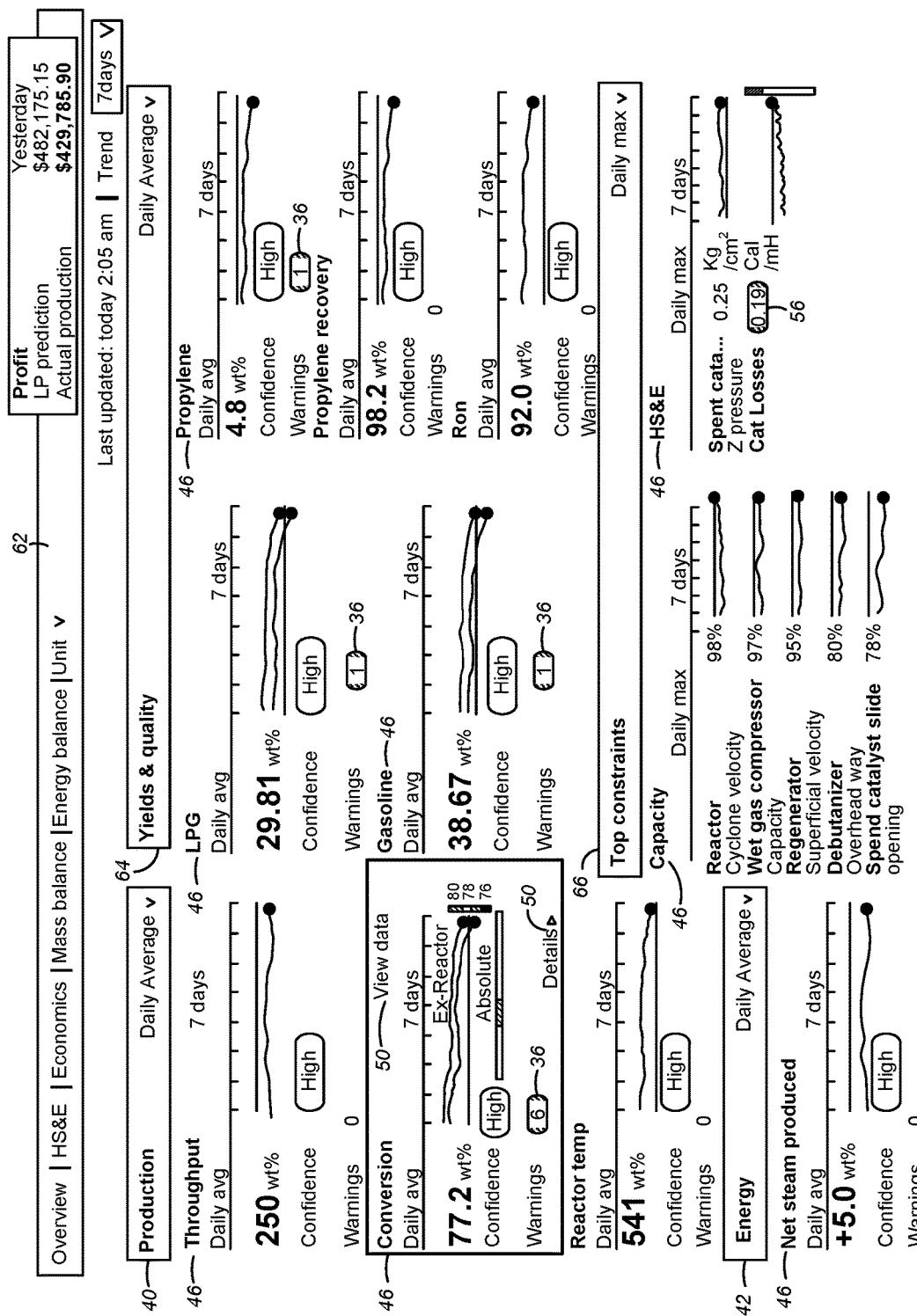

As depicted in FIG. 4C, when the warning button 36 in the conversion component sub-window section 46 is selected or clicked, the view data or detail button 50 may be displayed.

Figure 4D:
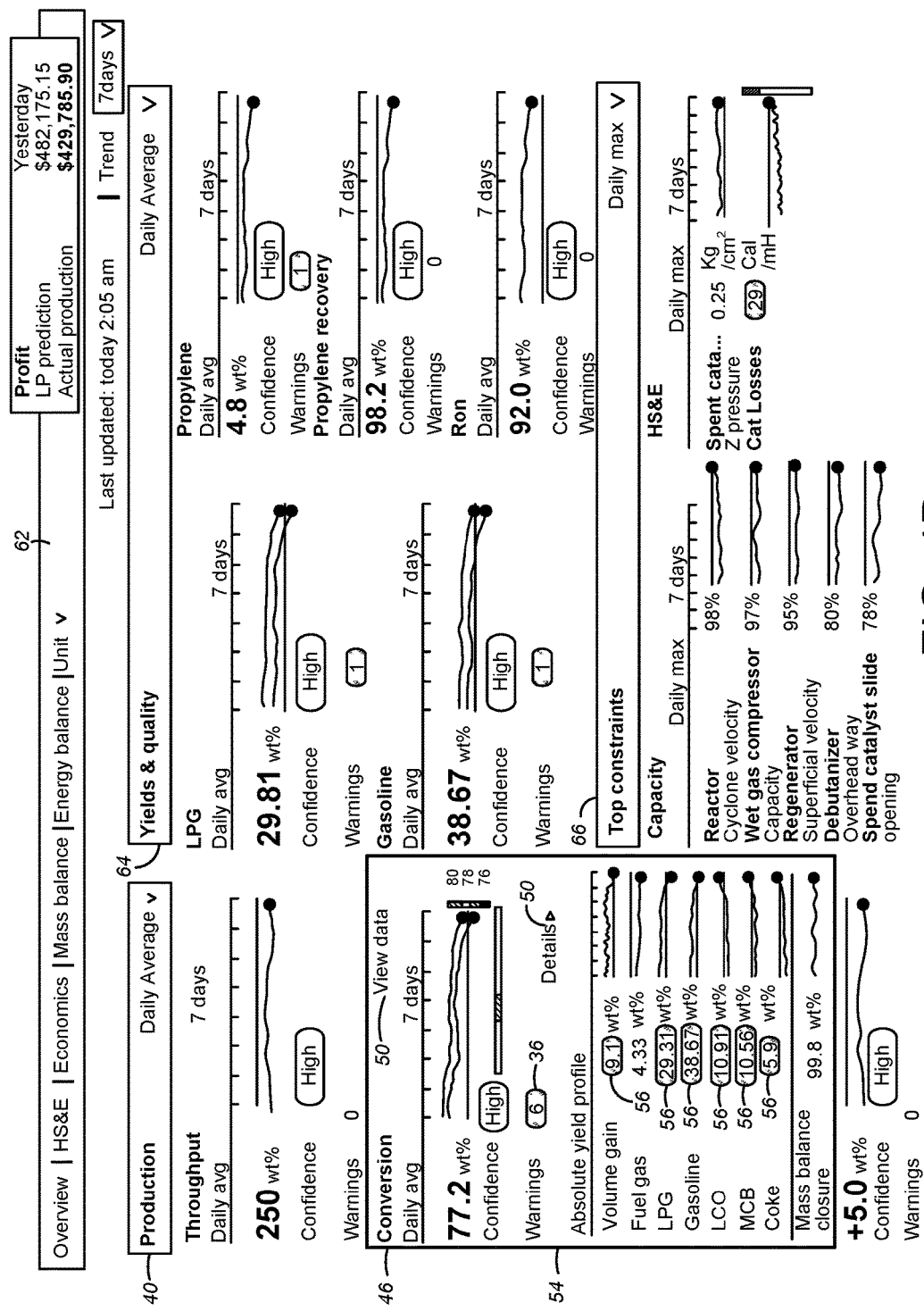

As depicted in FIG. 4D, when the view data or detail button 59 is selected, one or more (e.g., six) warning markers 56 having the parameter values associated with the corresponding number (e.g., six) critical level warnings may be shown in the detail pane 54 of the sub-window section 46, (e.g., Volume Gain, LPG, Gasoline, Light Cycle Oil (LCO), Main Column Bottom (MCB), Coke).

Figure 4E:
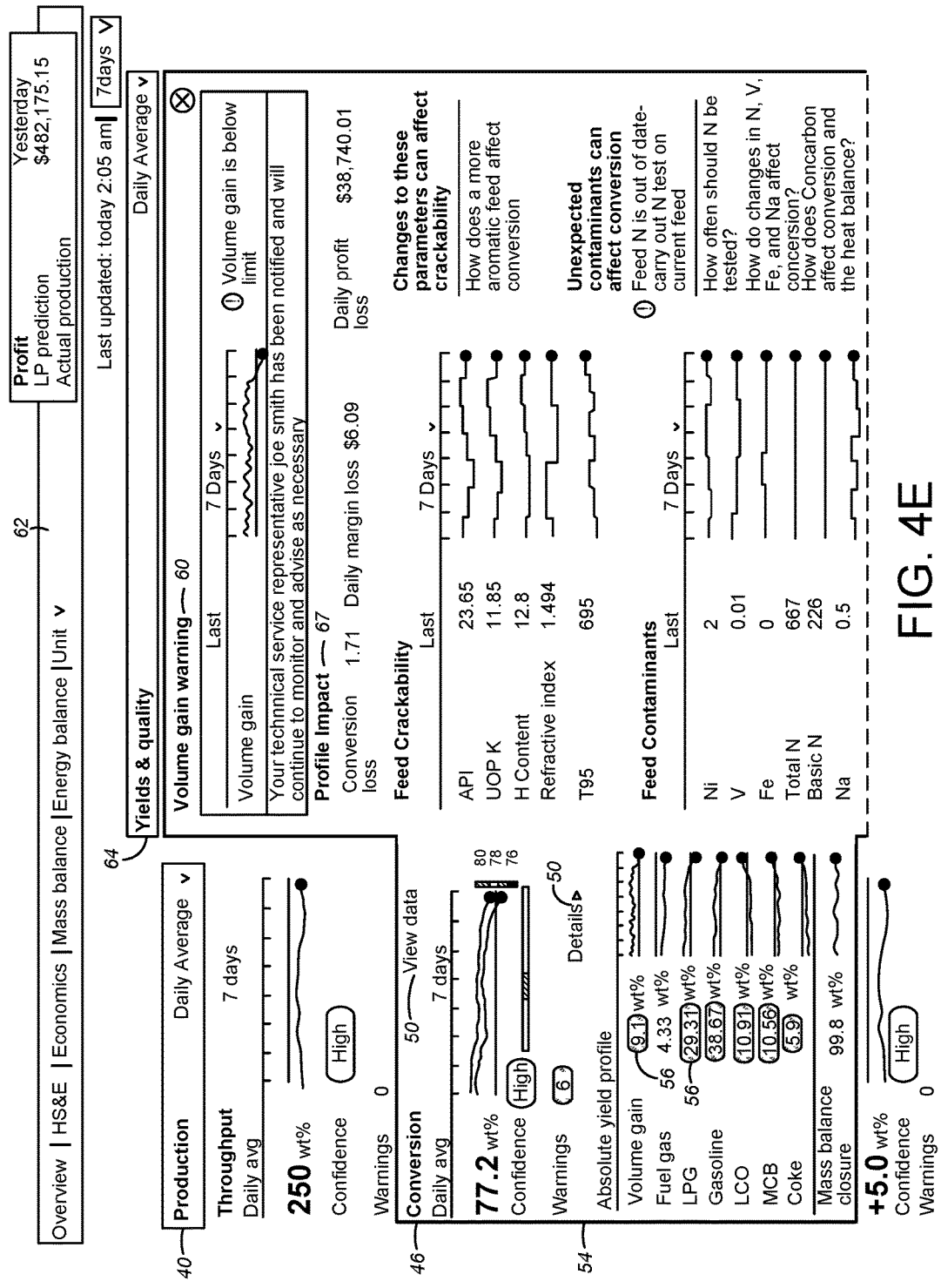
Figure 4E:
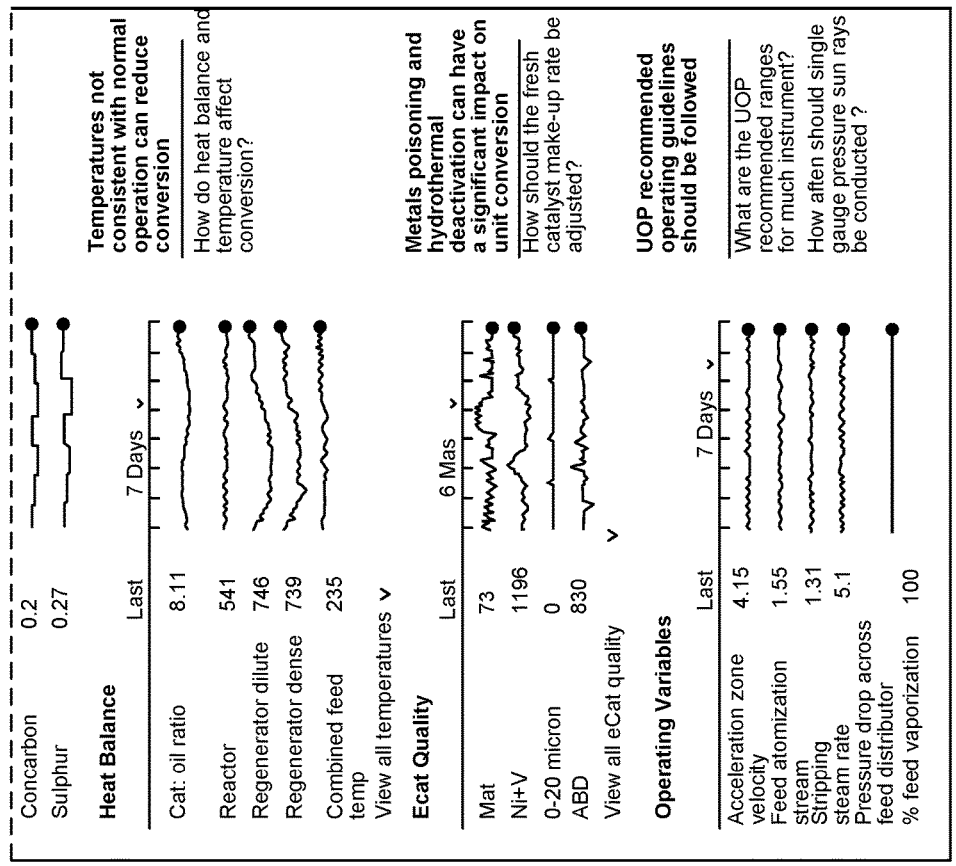

In FIG. 4E, as described above, one of the warning markers 56 may be selected or clicked. For example, the warning marker 56 of the sublevel display item for volume gain component may be selected. At that moment, the action pane 60 may be displayed, and may illustrate detailed information about a Volume Gain component shown in the detail pane 54, as depicted in FIG. 4E. In this example, the action pane 60 may include a Volume Gain warning describing the faulty condition of low Volume Gain for the fluid catalytic cracking chemical process.

In one or more embodiments, the action pane 60 may include an impact information pane 67 designed for displaying an itemized impact list having at least one of a conversion loss, a daily margin loss, and/or a daily profit loss. For example, the analysis unit 28 may calculate a monetary amount of the daily profit loss based on the faulty condition(s).

As another example, a key performance indicator alert dashboard may be related to a different process (e.g., an olefin production process). A key performance indicator alert dashboard associated with such a process may include warning buttons associated with, for example, a propane specific consumption or a reactor total ΔT.

Figure 5:
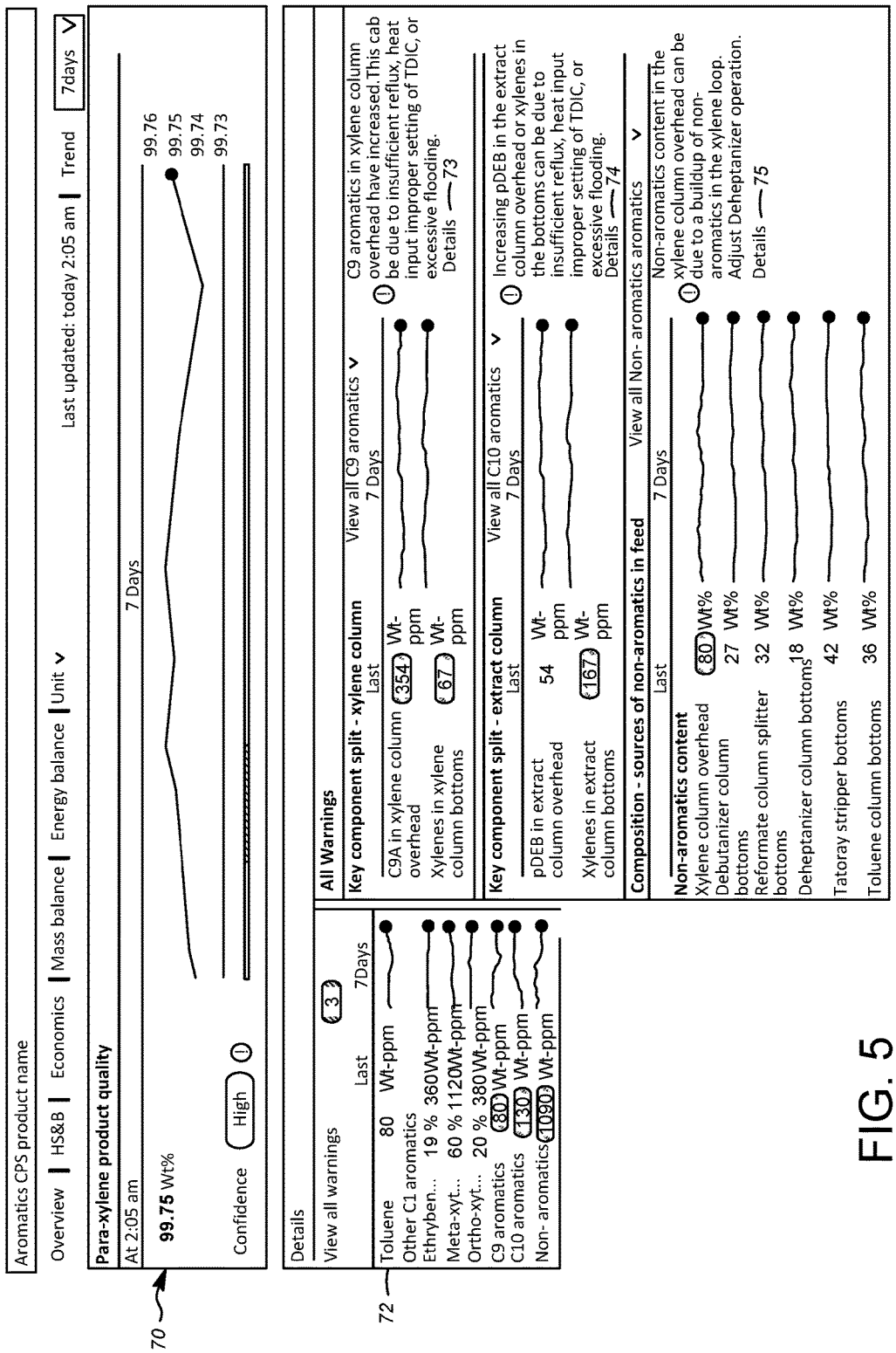
FIGS. 5-8 depict illustrative alert dashboards and/or aspects thereof that may be used in a diagnostic system for displaying hierarchical diagnostic data in accordance with one or more embodiments of the present disclosure.

Referring now to FIG. 5, an illustrative interactive display 30 may be configured to display a paraxylene dashboard 70 for an aromatics process, in which a detail panel 72 may be provided indicating various parameters. Also shown are all (in this example, three) active warnings 73, 74, 75 affecting para-xylene product quality. The interactive display 30 may show the paraxylene dashboard 70 alongside alert dashboard 32 or in its place.

Figure 6:
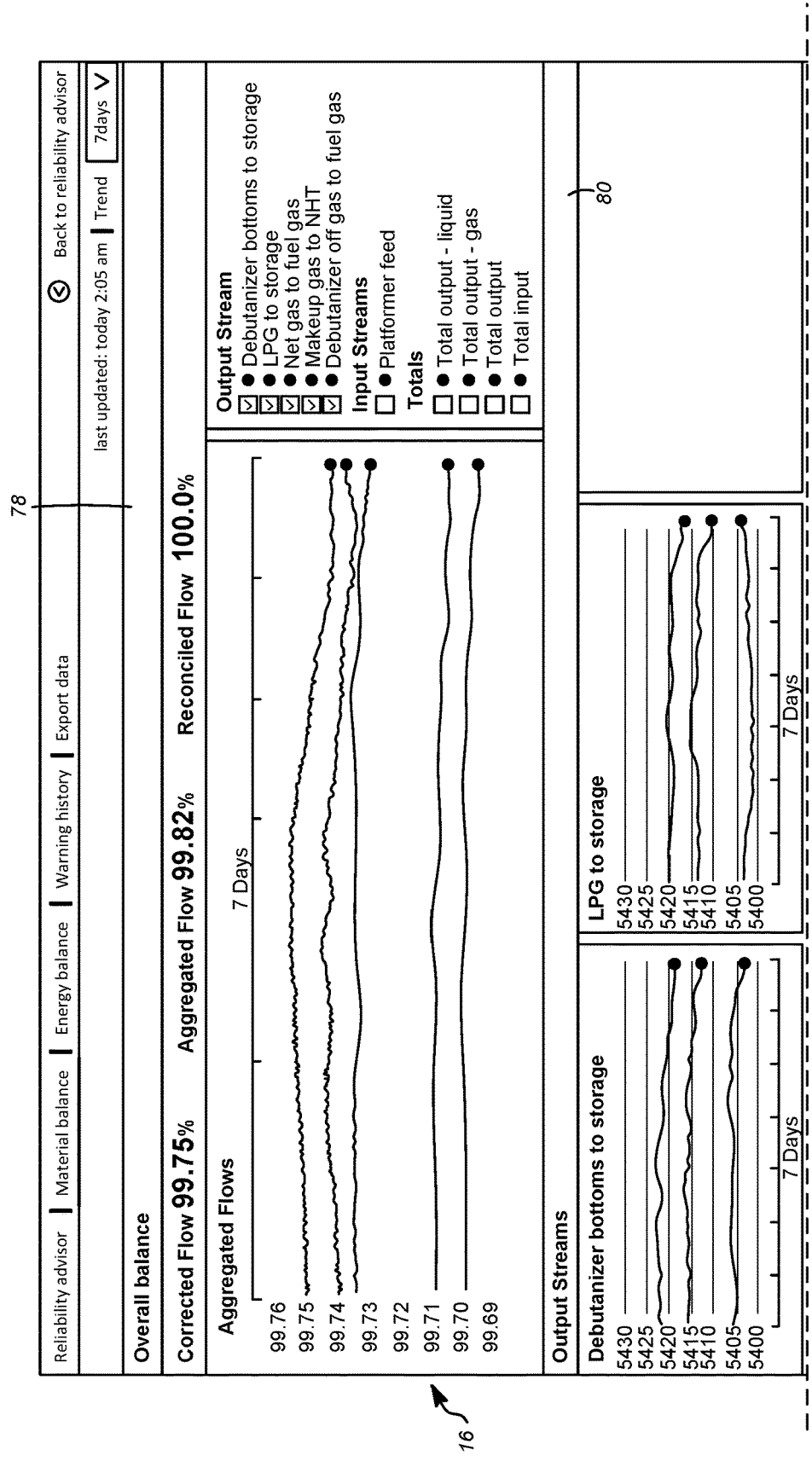
Figure 6:
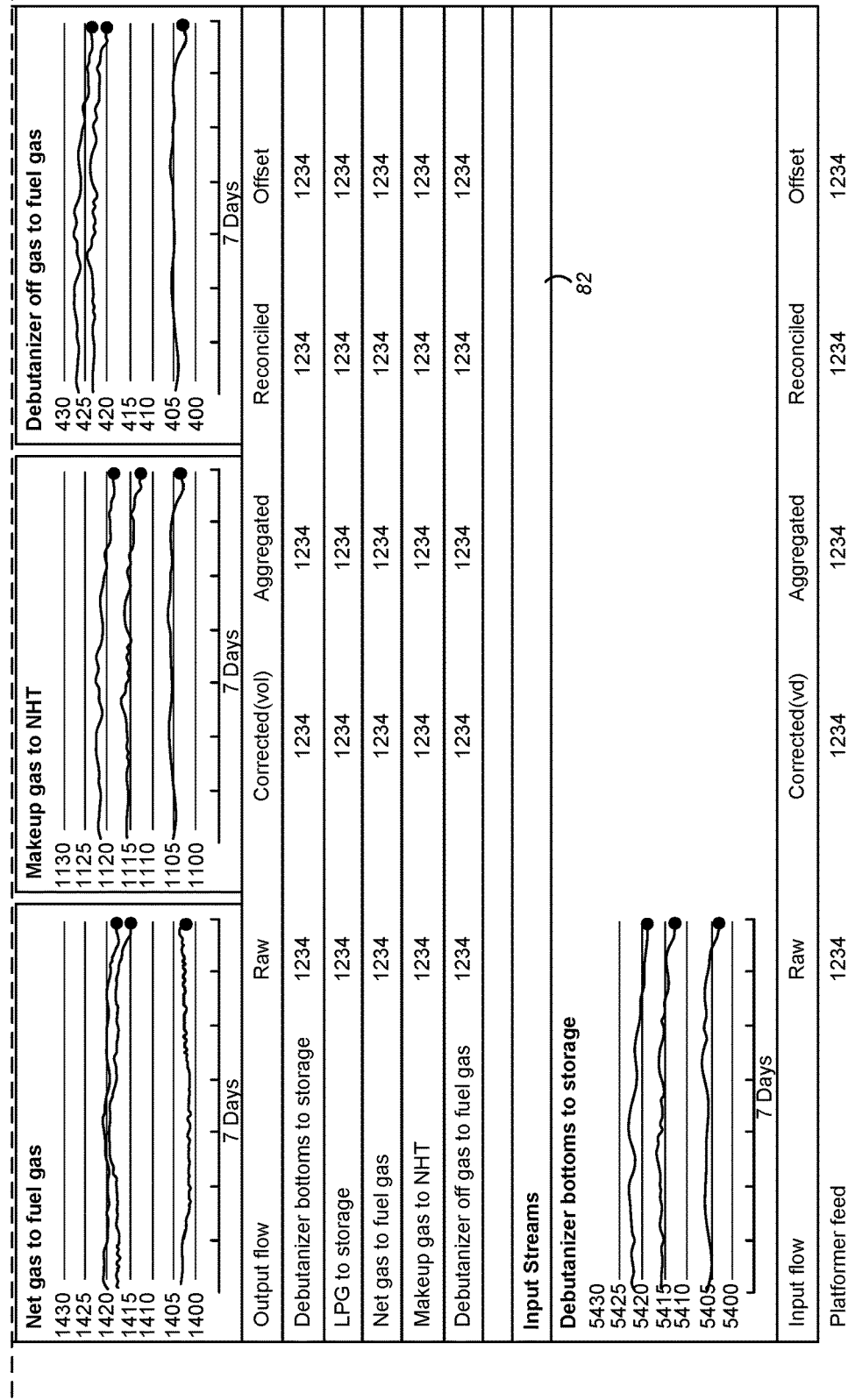

Referring now to FIG. 6, an illustrative dashboard 76 is shown in a portrait aspect ratio, depicting an overall material balance 78 and various output streams 80 and input streams 82. The interactive display 30 may show the dashboard 76 alongside alert dashboard 32 or in its place.

Figure 7:
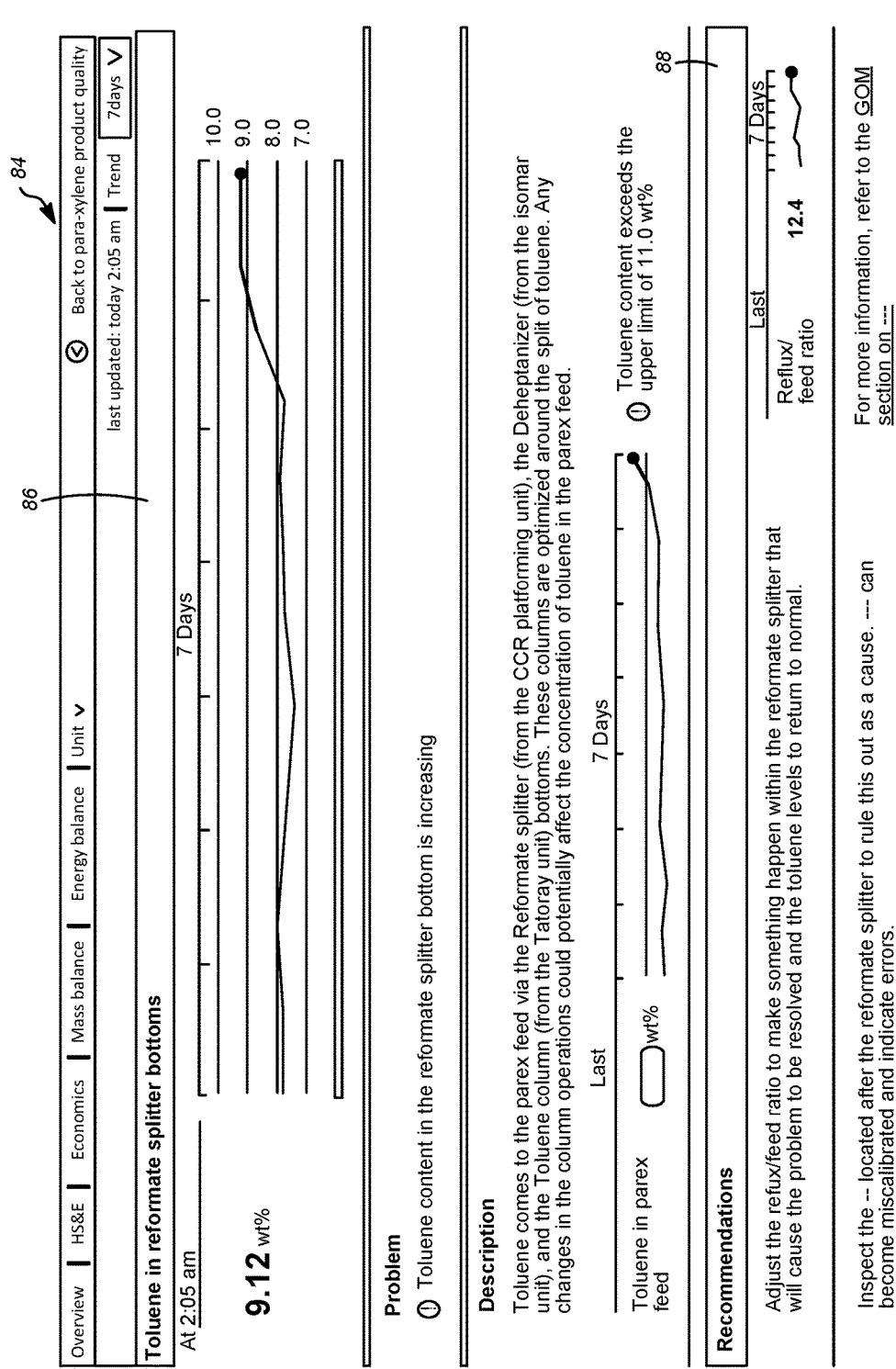
Figure 7:
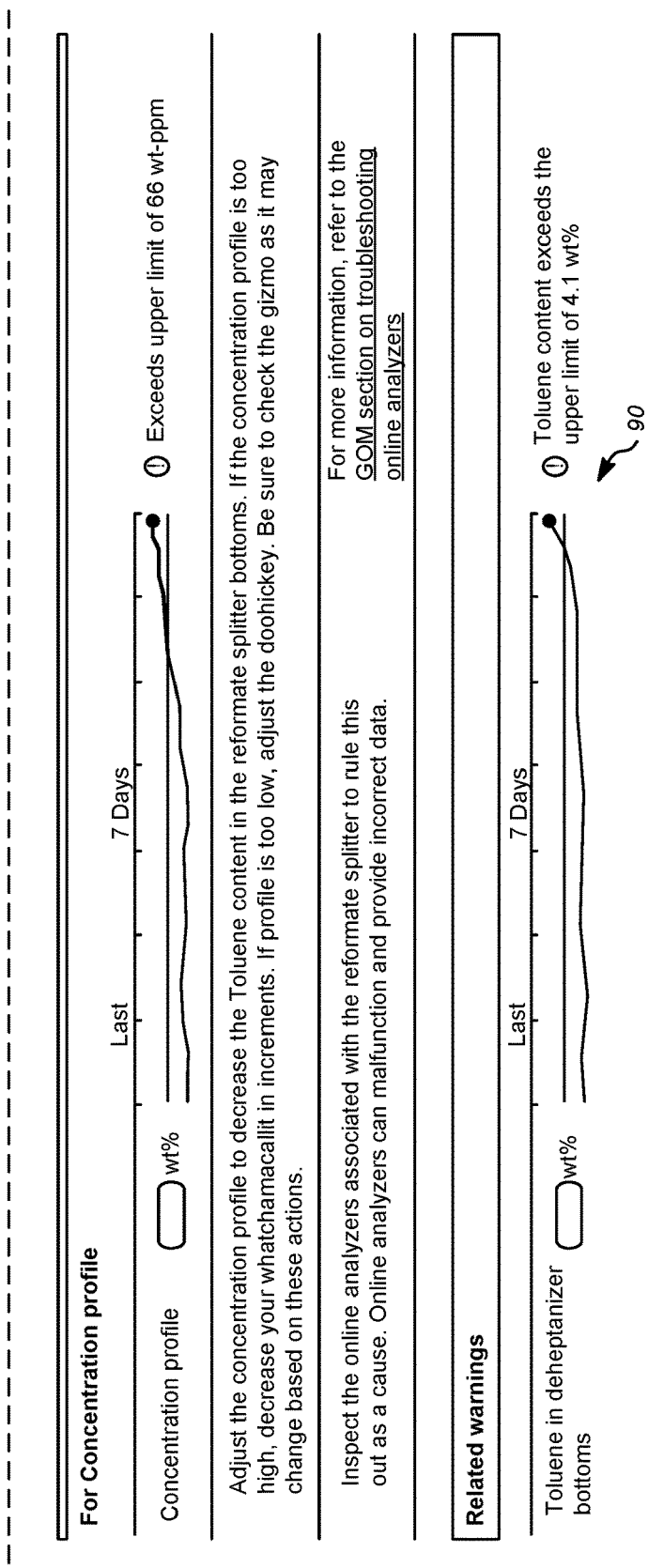

Referring now to FIG. 7, an illustrative alternative action panel 84 is shown for an alert dashboard, which may include a problem description 86, detailed text recommendations 88, and/or related warnings 90, which may be presented textually and/or using icons. The interactive display 30 may show the action panel 84 alongside alert dashboard 32 or in its place.

Figure 8:
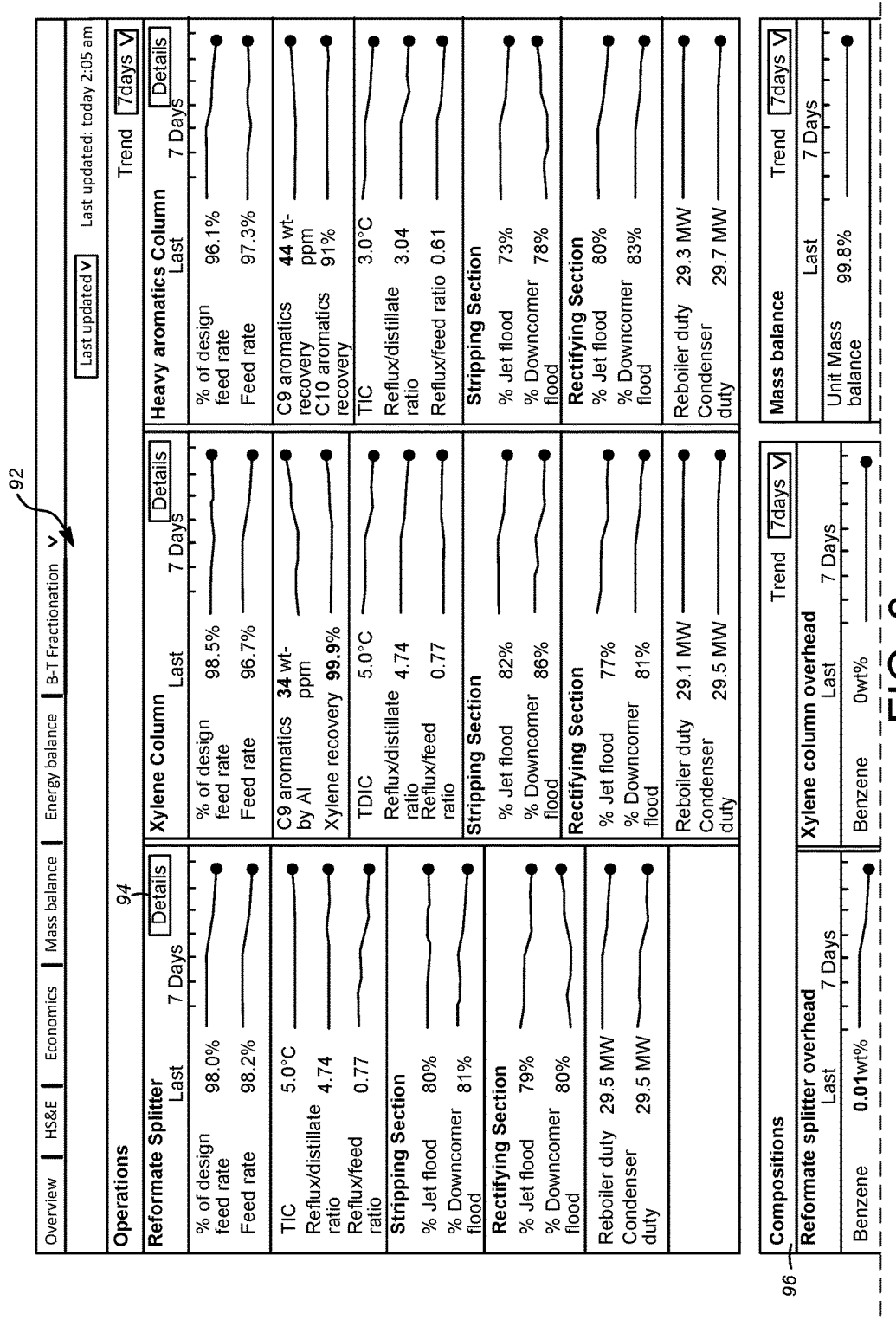
Figure 8:
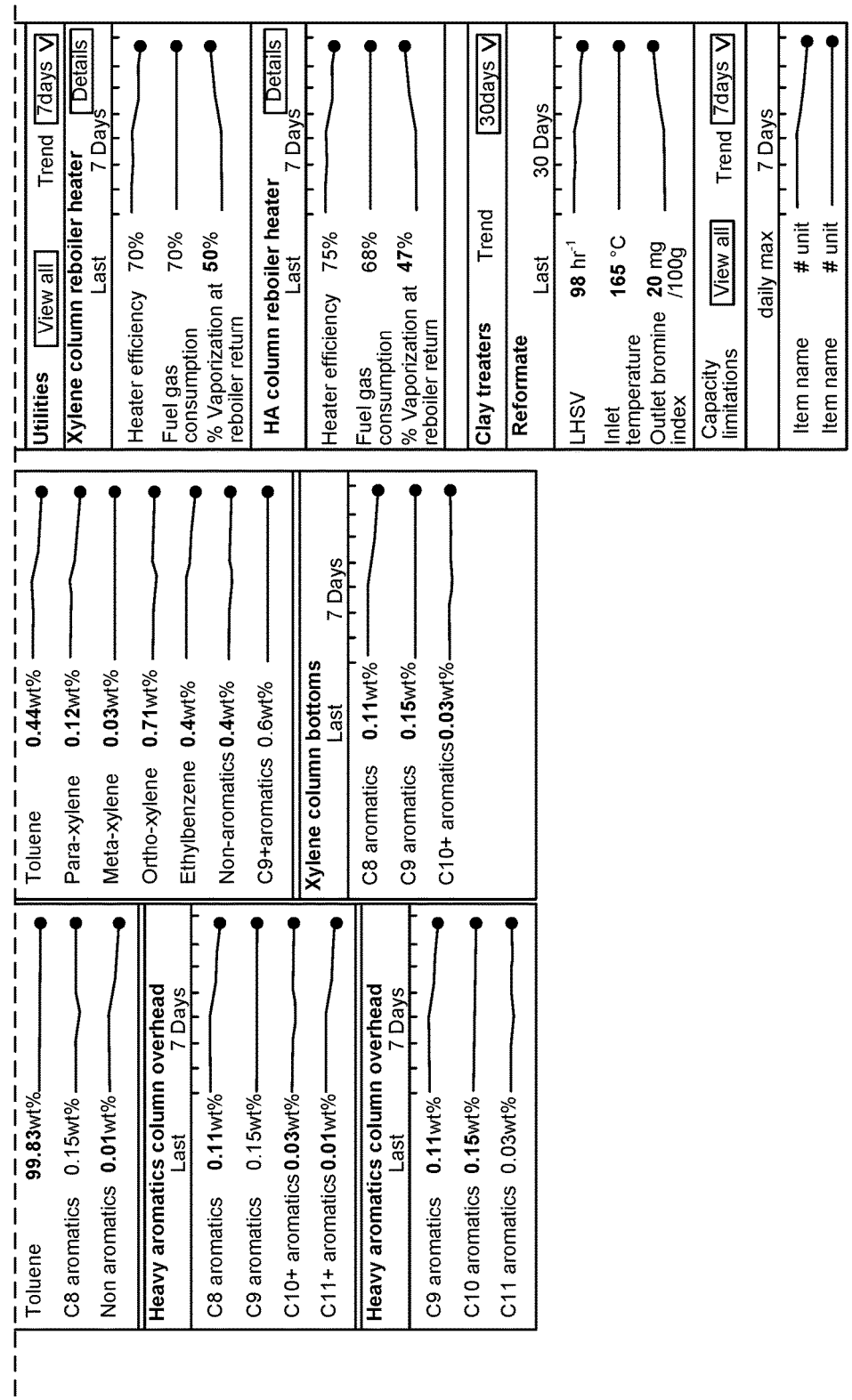

Referring now to FIG. 8, an illustrative xylene fractionation panel 92 of an alert dashboard is shown, numerically and graphically depicting various xylene fractionation process details, including operations 94 and compositions 96. The interactive display 30 may show the xylene fractionation panel 92 alongside alert dashboard 32 or in its place.

In any of the alert dashboards described herein, as the detection unit 22 detects more faulty conditions, the numerical indicator shown in a corresponding sub-window section may also increases its number to reflect the number of detected faulty conditions.

Additionally, the alert dashboard may be configured to, responsive to input, display an action pane. The action pane may include one or more warnings. The action pane may includes additional information about other operational parameters related to the particular process. In one example, a general information of how reactor conditions may affect the propane consumption may displayed in a separate window or pane. For example, the action pane may provide information about reactors used for the process, such as whether the reactors are in a critical condition because both reactors exceed a predetermined differential temperature threshold (e.g., 50° C.).

As another example, the alert dashboard may be configured to display general information relating to how calculated values may affect one or more factors or elements of the process (e.g., propane consumption). This additional information may be displayed in a same or another separate window or pane. For example, the action pane may provide information about process conditions, such as a catalyst condition, a fired heater health condition, a suction pressure condition, and/or the like. Some examples of these conditions are illustrated in FIG. 3F and FIG. 4E.

An action pane may be provided using one or more shapes (e.g., square, rectangle, triangle, circle, oval, hexagon, or the like). The shape of a user interface element may provide information. For example, a first shape may indicate that the interface element is clickable to expand and provide additional information, while a second shape may indicate that the interface element is not clickable or expandable. As another example, a shape may be associated with an alert. For example, a first shape may be associated with a warning related to a portion of a process being available, while a second shape may be associated with no warning related to the portion of the process being available.

As another example, an alert dashboard may be used in connection with a different process (e.g., a naphtha reforming process). The key performance indicator alert dashboard may include one or more user interface elements that provide information, alerts, or warnings related to the particular process. For example, a key performance indicator alert dashboard related to a naptha reforming process may include warnings related to a C5+YIELD or a recycle gas $H_2$ purity. As described above, other suitable chemical processes may suit different applications using a display configuration similar to that described above.

Without further elaboration, it is believed that using the preceding description that one skilled in the art may use the present disclosure to its fullest extent and easily ascertain the essential characteristics of this disclosure, without departing from the spirit and scope thereof, to make various changes and modifications of the disclosure and to adapt it to various usages and conditions. The preceding specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While one or more particular embodiments of a diagnostic system has been described herein, it will be appreciated by those skilled in the art that changes and modifications may be made thereto without departing from the disclosure in its broader aspects and as set forth in the following claims.

What is claimed is:

1. A system comprising:
 a petrochemical plant comprising:
  a pump;
  a compressor;
  a plurality of valves; and
  one or more sensors associated with the pump, the compressor, or one or more of the plurality of valves;
 a detection platform comprising:
  a communication interface of the detection platform;
  one or more processors of the detection platform; and
  memory storing executable instructions that, when executed by the one or more processors of the detection platform, cause the detection platform to:
   receive, via the communication interface of the detection platform, sensor data from the one or more sensors of the petrochemical plant, the sensor data comprising a plurality of readings of measurements associated with the pump, the compressor, or the one or more of the plurality of valves of the petrochemical plant; and
   based on the sensor data, detect a faulty condition of a process of the petrochemical plant based on the plurality of readings of measurements being associated with the faulty condition;
 an analysis platform comprising:
  a communication interface of the analysis platform;
  one or more processors of the analysis platform; and
  memory storing executable instructions that, when executed by the one or more processors of the analysis platform, cause the analysis platform to:
   determine an operating status of the petrochemical plant based on the plurality of readings of measurements associated with the pump, the compressor, or the one or more of the plurality of valves of the petrochemical plant; and
   determine an offset based on the plurality of readings of measurements associated with the pump, the compressor, or the one or more of the plurality of valves of the petrochemical plant;
 a visualization platform comprising:
  a communication interface of the visualization platform;
  one or more processors of the visualization platform; and
  memory storing executable instructions that, when executed by the one or more processors of the visualization platform, cause the visualization platform to:
   generate an alert dashboard comprising a display of the operating status of the petrochemical plant and the plurality of readings of measurements associated with the pump, the compressor, or the one or more of the plurality of valves of the petrochemical plant, the alert dashboard grouping related data into data groups based on respective sources of the related data, the alert dashboard illustrating relationships between the related data; and
 an alert platform comprising:
  a communication interface of the alert platform;
  one or more processors of the alert platform; and
  memory storing executable instructions that, when executed by the one or more processors of the alert platform, cause the alert platform to:
   generate a warning message based on the plurality of readings of measurements associated with the pump, the compressor, or the one or more of the plurality of valves of the petrochemical plant, the warning message associated with the faulty condition of the process of the petrochemical plant.

2. The system of claim 1, wherein the executable instructions of the analysis platform, when executed, cause the analysis platform to:
 generate a process decision tree based on a causal relationship between the faulty condition and corresponding particular measurements of the plurality of readings of measurements associated with the pump, the compressor, or the one or more of the plurality of valves of the petrochemical plant.

3. The system of claim 1, comprising:
 a display device configured to:
  display a graphical link between the faulty condition of the process of the petrochemical plant and the plurality of readings of measurements associated with the pump, the compressor, or the one or more of the plurality of valves of the petrochemical plant.

4. The system of claim 1, wherein the executable instructions of the alert platform, when executed, cause the alert platform to:
 send, to a mobile computing device associated with an operator of the petrochemical plant, the warning message associated with the faulty condition of the process of the petrochemical plant,
 the warning message comprising one or more of the plurality of readings of measurements associated with the pump, the compressor, or the one or more of the plurality of valves of the petrochemical plant.

5. The system of claim 1, wherein the executable instructions of the visualization platform, when executed, cause the visualization platform to:
 generate a window section of the alert dashboard, the window section including a primary component sub-window section configured to display the faulty condition of the process of the petrochemical plant; and
 generate an interactive warning button disposed in the window section of the alert dashboard, the alert dashboard configured to respond to a selection of the interactive warning button by displaying a hierarchical navigation relating to the faulty condition of the process of the petrochemical plant displayed in the window section.

6. The system of claim 5, wherein the executable instructions of the visualization platform, when executed, cause the visualization platform to:
 change a color of the interactive warning button based on a severity level of an associated warning.

7. The system of claim 6, wherein the executable instructions of the visualization platform, when executed, cause the visualization platform to:
 use a first color of the interactive warning button to correspond to a critical warning associated with the faulty condition of the process of the petrochemical plant; and
 use a second color of the interactive warning button to correspond to a cautionary warning associated with the faulty condition of the process of the petrochemical plant.

8. The system of claim 5, wherein the executable instructions of the visualization platform, when executed, cause the visualization platform to:
cause the interactive warning button to include a number corresponding to a total number of faulty conditions of the process of the petrochemical plant.

9. The system of claim 5, wherein the executable instructions of the visualization platform, when executed, cause the visualization platform to:
generate a view data button disposed in the window section of the alert dashboard; and
based on receiving a selection of the view data button, adjust the alert dashboard to include an interface configured to facilitate transmission to another system of the plurality of readings of measurements associated with the pump, the compressor, or the one or more of the plurality of valves of the petrochemical plant.

10. The system of claim 5, wherein the executable instructions of the visualization platform, when executed, cause the visualization platform to:
generate, in the window section of the alert dashboard, a graphical representation of time-based information related to the process of the petrochemical plant during a predetermined sampling period.

11. The system of claim 5, wherein the executable instructions of the visualization platform, when executed, cause the visualization platform to:
generate an action pane comprising additional details associated with a factor related to a corresponding higher-level display item displayed on the alert dashboard.

12. The system of claim 1, wherein the executable instructions of the analysis platform, when executed, cause the analysis platform to:
determine a relationship between the faulty condition of the process of the petrochemical plant and a different faulty condition of the process of the petrochemical plant.

13. The system of claim 1, wherein the executable instructions of the analysis platform, when executed, cause the analysis platform to:
determine a target operational parameter of a final product of the petrochemical plant.

14. The system of claim 1, wherein the executable instructions of the analysis platform, when executed, cause the analysis platform to:
cause a corrective action to be taken based on determining equipment information of the petrochemical plant; and
adjust one or more inputs or controls relating to the process of the petrochemical plant.

15. A system comprising:
a petrochemical plant comprising:
a pump;
a compressor;
a plurality of valves; and
one or more sensors associated with the pump, the compressor, or one or more of the plurality of valves;
a detection platform comprising:
one or more processors of the detection platform; and
memory storing executable instructions that, when executed by the one or more processors of the detection platform, cause the detection platform to:
receive sensor data from the one or more sensors of the petrochemical plant, the sensor data comprising a plurality of readings of measurements associated with the pump, the compressor, or the one or more of the plurality of valves of the petrochemical plant; and
based on the sensor data, detect a faulty condition of a process of the petrochemical plant based on the plurality of readings of measurements being associated with the faulty condition;
an analysis platform comprising:
one or more processors of the analysis platform; and
memory storing executable instructions that, when executed by the one or more processors of the analysis platform, cause the analysis platform to:
determine an operating status of the petrochemical plant based on the plurality of readings of measurements associated with the pump, the compressor, or the one or more of the plurality of valves of the petrochemical plant;
a visualization platform comprising:
one or more processors of the visualization platform; and
memory storing executable instructions that, when executed by the one or more processors of the visualization platform, cause the visualization platform to:
generate an alert dashboard comprising a display of the operating status of the petrochemical plant and the plurality of readings of measurements associated with the pump, the compressor, or the one or more of the plurality of valves of the petrochemical plant, the alert dashboard grouping related data into data groups based on respective sources of the related data, the alert dashboard illustrating relationships between the related data;
generate a window section of the alert dashboard, the window section including a primary component sub-window section configured to display the faulty condition of the process of the petrochemical plant; and
generate an interactive warning button disposed in the window section of the alert dashboard, the alert dashboard configured to respond to a selection of the interactive warning button by displaying a hierarchical navigation relating to the faulty condition of the process of the petrochemical plant displayed in the window section; and
an alert platform comprising:
one or more processors of the alert platform; and
memory storing executable instructions that, when executed by the one or more processors of the alert platform, cause the alert platform to:
generate a warning message based on the plurality of readings of measurements associated with the pump, the compressor, or the one or more of the plurality of valves of the petrochemical plant, the warning message associated with the faulty condition of the process of the petrochemical plant.

16. The system of claim 15, wherein the executable instructions of the visualization platform, when executed, cause the visualization platform to:
change a color of the interactive warning button based on a severity level of an associated warning.

17. The system of claim 16, wherein the executable instructions of the visualization platform, when executed, cause the visualization platform to:

use a first color of the interactive warning button to correspond to a critical warning associated with the faulty condition of the process of the petrochemical plant; and use a second color of the interactive warning button to correspond to a cautionary warning associated with the faulty condition of the process of the petrochemical plant.

18. The system of claim 15, wherein the executable instructions of the visualization platform, when executed, cause the visualization platform to:

cause the interactive warning button to include a number corresponding to a total number of faulty conditions of the process of the petrochemical plant.

19. The system of claim 15, wherein the executable instructions of the visualization platform, when executed, cause the visualization platform to:

generate a view data button disposed in the window section of the alert dashboard; and based on receiving a selection of the view data button, adjust the alert dashboard to include an interface configured to facilitate transmission to another system of the plurality of readings of measurements associated with the pump, the compressor, or the one or more of the plurality of valves of the petrochemical plant.

20. The system of claim 15, wherein the executable instructions of the visualization platform, when executed, cause the visualization platform to:

generate, in the window section of the alert dashboard, a graphical representation of time-based information related to the process of the petrochemical plant during a predetermined sampling period.

21. The system of claim 15, wherein the executable instructions of the visualization platform, when executed, cause the visualization platform to:

generate an action pane comprising additional details associated with a factor related to a corresponding higher-level display item displayed on the alert dashboard.

22. The system of claim 15, wherein the executable instructions of the analysis platform, when executed, cause the analysis platform to:

determine an offset based on the plurality of readings of measurements associated with the pump, the compressor, or the one or more of the plurality of valves of the petrochemical plant.

* * * * *